US012698210B2

(12) United States Patent
   Mancevski

(10) Patent No.: US 12,698,210 B2
(45) Date of Patent: Aug. 4, 2026

(54) DEVICE, METHOD, AND CARBON PILL FOR SYNTHESIZING GRAPHENE

(71) Applicant: Universal Matter Inc., Burlington (CA)

(72) Inventor: Vladimir Mancevski, Austin, TX (US)

(73) Assignee: Universal Matter Inc., Burlington (CA)

( * ) Notice: Subject to any disclaimer, the term of this patent is extended or adjusted under 35 U.S.C. 154(b) by 1024 days.

(21) Appl. No.: 17/768,202

(22) PCT Filed: Oct. 13, 2020

(86) PCT No.: PCT/CA2020/051368
    § 371 (c)(1),
    (2) Date: Apr. 11, 2022

(87) PCT Pub. No.: WO2021/068087
    PCT Pub. Date: Apr. 15, 2021

(65) Prior Publication Data
    US 2024/0092643 A1      Mar. 21, 2024

Related U.S. Application Data

(60) Provisional application No. 62/914,240, filed on Oct. 11, 2019.

(51) Int. Cl.
    *C01B 32/184*          (2017.01)
(52) U.S. Cl.
    CPC ........ *C01B 32/184* (2017.08); *C01B 2204/22* (2013.01); *C01P 2002/82* (2013.01)
(58) Field of Classification Search
    CPC ... C01B 32/184; C01B 2204/22; C01B 32/05; C01B 32/182; C01B 2204/20;
    (Continued)

(56) References Cited

U.S. PATENT DOCUMENTS

| 5,794,113 | A | * | 8/1998 | Munir | ..................... B22F 3/23 |
| | | | | | 419/48 |
| 9,840,782 | B2 | | 12/2017 | Santhanam et al. | |
| 2016/0008787 | A1 | | 1/2016 | Liu et al. | |

FOREIGN PATENT DOCUMENTS

| CN | 1328119 A | 12/2001 |
| CN | 103145123 | 6/2013 |
| | (Continued) | |

OTHER PUBLICATIONS

Varghese, et al., Technology, applications and modelling of ohmic heating: a review, J. Food. Sci. Technol. 2014; 51(10): 2304-2317 (Year: 2014).*

(Continued)

*Primary Examiner* — Daniel C. Mccracken
(74) *Attorney, Agent, or Firm* — Own Innovation Inc.; James W. Hinton; Osman Ismaili

(57) ABSTRACT

A device for converting a carbon pill into graphene is provided including a space between at least two electrically conductive surfaces, wherein the electrically conductive surfaces are configured to support a carbon pill in the space. The device also includes at least two electrodes electrically coupled to the at least two electrically conductive surfaces. The device also includes a power supply connected to the electrodes for passing a current through the electrodes to convert the carbon pill into graphene. A carbon pill for graphene conversion is also provided including a first carbon material for synthesizing to graphene by joule heating. The first carbon material is compressed from a powder form into a pill form. The carbon pill includes a second material for at least one of binding the first carbon material from a powder form into a pill form and improving conductivity of the first carbon material.

16 Claims, 18 Drawing Sheets

(58) Field of Classification Search

CPC ..... C01B 32/186; C01B 32/188; C01B 32/19; C01B 32/192; C01B 32/194; C01B 32/196; C01B 32/198; C01B 2204/00; C01B 2204/02; C01B 2204/04; C01B 2204/06; C01B 2204/065; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; C01P 2002/82; C01P 2004/61; C01P 2006/10; C01P 2006/40; C04B 35/632; C04B 35/63408; C04B 2235/3418; C04B 2235/424; C04B 2235/5288; C04B 2235/5427; C04B 2235/5436; C04B 2235/6028; C04B 2235/604; C04B 2235/608; C04B 2235/94; C04B 35/522; C04B 35/532; C04B 35/6313; C04B 35/6316; C04B 35/6325; C04B 35/6365; C04B 35/645; C30B 1/023; C30B 30/02; C30B 29/02

See application file for complete search history.

(56) References Cited

FOREIGN PATENT DOCUMENTS

| | | | |
|---|---|---|---|
| CN | 113165880 A | 7/2021 | |
| KR | 20190082534 A | 7/2019 | |
| WO | 2019014404 A1 | 1/2019 | |
| WO | 2019046320 A1 | 3/2019 | |
| WO | 2019135502 A1 | 7/2019 | |
| WO | 2020051000 A1 | 3/2020 | |
| WO | WO 2020/051000 * | 3/2020 | ............. C01B 32/19 |

OTHER PUBLICATIONS

U.S. Appl. No. 62/727,510, filed 2020.*
U.S. Appl. No. 62/880,482, filed 2020.*

Yue, et al., Synthesis of highly mesoporous carbon pellets from carbon black and polymer binder by chemical activation, Microporous and Mesoporous Materials 2006; 96: 314-320 (Year: 2006).*

Mogera, et al., Highly Decoupled Graphene Multilayers: Turbostraticity at its Best, J. Phys. Chem. Lett. 2015; 6: 4437-4443 (Year: 2015).*

Garlow, et al., Large-Area Growth of Turbostratic Graphene on Ni(111) via Physical Vapor Deposition, Scientific Reports 2016; 6: 19804—pp. 1-11 (Year: 2016).*

European Patent Office, Supplementary European Search Report for EP Patent App. No. 20873985.4, Nov. 30, 2023.

National Intellectual Property Administration, P.R. China, Search Report for CN Patent App. No. 2020800857583, Aug. 2, 2023.

Varghese et al., "Technology, applications and modelling of ohmic heating: a review", Journal of Food Science and Technology, Springer (India) Private Ltd, India, vol. 51, No. 10, Apr. 29, 2012, pp. 2304-2317, XP035405494.

Yue et al., "Synthesis of highly mesoporous carbon pellets from carbon black and polymer binder by chemical activation", Microporous and Mesoporous Material, Elsevier, Amsterdam, NL, vol. 96, No. 1-3, Nov. 26, 2006, pp. 314-320, XP025179447.

Candini et al. "Electroburning of few-layer graphene flakes, epitaxial graphene, and turbostratic graphene discs in air and under vacuum", Belstein J. Nanotechnol., 2016, 5, 711-719.

CIPO as ISA, International Search Report and Written Opinion for PCT/CA2020/051368, Jan. 13, 2021.

Fang et al., "A review of large-area bilayer graphene synthesis by chemical vapor deposition", Nanoscale, 2015, 7, 20335-20351.

Garlow et al., "Large-Area Growth of Turbostratic Graphene on Ni(111) via Physical Vapor Deposition", Jan. 29, 2016, Scientific Reports, 6:19804.

Japan Patent Office, Office Action for JP Patent App. No. 2022-522001, Nov. 5, 2024.

Korean Intellectual Property Office, Notice of Non-final Rejection for KR Patent App. No. 2022-7015721, May 22, 2025.

* cited by examiner

DEVICE, METHOD, AND CARBON PILL FOR SYNTHESIZING GRAPHENE

TECHNICAL FIELD

The embodiments disclosed herein relate to production of graphene, and, in particular to methods, devices, and a carbon pill for producing graphene.

INTRODUCTION

Graphene may be produced by conversion of carbon-based powder materials through joule heating. The carbon-based powder is packed into a small quartz tube container and voltage is applied to each end of the powder material via metal (copper, copper wool, brass) electrodes. However, powder storage, powder transportation, and filling of powder into a tube (powder confinement) produce several challenges in industrial applications and are not practical for the mass production of graphene.

Further, the quartz tubes that may be used for joule heating are cost-inefficient because they are degraded and contaminated during the joule heating process when the carbon powder comes into contact with the quartz. The quartz tubes must be disposed after a single use, which may significantly increase the cost of producing graphene on an industrial scale. The copper wool that is used as an electrode is also degraded by the process, which further increases the costs for producing graphene. Use of metal electrodes, such as copper and brass, which make direct contact with the graphene may also add metal contaminants into the graphene powder that is produced.

Accordingly, there is a need for new cost efficient methods, products, and devices for producing graphene on an industrial scale. Methods, products, and devices of producing graphene which preserve the quartz used during synthesis may reduce costs. Further, products, methods, and devices are necessary to allow for improved storage, transportation, and processing of materials necessary for producing graphene, thereby allowing for low-cost, industrial production of graphene.

SUMMARY

According to some embodiments, there is a device for converting a carbon pill into graphene which includes a space between at least two electrically conductive surfaces. The electrically conductive surfaces are configured to support at least one carbon pill in the space. The device includes at least two electrodes electrically coupled to the at least two electrically conductive surfaces. The device includes a power supply connected to the electrodes for passing a current through the electrodes to convert the at least one carbon pill into graphene.

The device may include a shield positioned to surround the space configured to block deflected powder from the carbon pill without contacting the at least one carbon pill.

The device may include a force sensor for detecting compression force applied to the at least one carbon pill.

The device may include a resistance sensor for measuring electrical resistance of the at least one carbon pill.

The device may provide that at least two conductive surfaces are coupled to compression springs to apply compressive force to the conductive surfaces and suspend the at least one carbon pill in the space.

The device may provide that the conductive disks are graphite disks.

The device may provide that the shield is made from quartz.

The device may provide that the electrically conductive surfaces are resilient at high temperatures.

The device may provide that the electrically conductive surfaces operate at termperatures above 900° C.

The device may provide that the at least one carbon pill is a plurality of carbon pills.

Turbostratic graphene may be produced by the device.

According to some embodiments, provided is a method for synthesizing graphene which includes compressing a at least one carbon pill in between two electrodes. The at least one carbon pill includes a first carbon material for synthesizing graphene by joule heating. The at least one carbon pill also includes a second material for at least one of binding the first carbon material from a powder form into a pill form and improving conductivity of the first carbon material. The method also includes applying an electric current to the at least one carbon pill. The method also includes converting predominantly the first carbon material to graphene.

The method may provide that applying an electric current to the at least one carbon pill includes applying an electric current to the at least one carbon pill at a lower voltage for removing moisture and volatile materials from the at least one carbon pill. Applying an electric current to the carbon pill may also include applying another electric current to the carbon pill at a higher voltage for converting the first carbon material to graphene.

The method may provide that the electric current is continuously applied between the lower voltage and the higher voltage.

The method may provide that the lower voltage is between 80V-100V.

The method may provide that the lower voltage heats the at least one carbon pill to a temperature of between 400° C.-800° C.

The method may provide that the higher voltage is between 160V-400V.

The method may provide that the electric current is applied for between 50 milliseconds to about 1 second.

The method may provide that the higher voltage heats the pill between 2800° C.-3000° C.

The method may provide that the at least one carbon pill is compressed with a force between 20N-60N.

The method may include positioning a shield to block deflected powder from the carbon pill, wherein the shield does not make physical contact with the carbon pill.

The method of may provide that the shield is quartz.

The method may include removing unconverted carbon from the graphene.

The method may provide that the at least one carbon pill is a plurality of carbon pills.

Turbostratic graphene may be produced from the method.

According to some embodiments, provided is a carbon pill for graphene conversion which includes a first carbon material for synthesizing to graphene by joule heating. The first carbon material is compressed from a powder form into a pill form. The carbon pill also includes a second material for at least one of binding the first carbon material from a powder form into a pill form and improving conductivity of the first carbon material.

The carbon pill may provide that the second material is for binding the first carbon material from a powder form into a pill form.

The carbon pill may provide that the second material is for improving conductivity of the first carbon material.

The carbon pill may provide that the first carbon material includes at least one of the group comprising petroleum coke, tire carbon black, metallurgical coke, plastic ash, ground coffee, and anthracite coal.

The carbon pill may provide that the second material is for binding the first carbon material from a powder form into a pill form and includes at least one of the group comprising ground coffee, corn starch, pine bark, polyethylene micro-wax, wax, chemplex 690, cellulose, naptenic oil, asphaltenes, and gilsonite.

The carbon pill may provide that the second material is for improving conductivity of the first carbon material and includes at least one of the group comprising petroleum coke, tire carbon black, carbon black, metallurgical coke, turbostratic graphene, and carbon nanotubes.

The carbon pill may have a density of about 0.7-1.4 g/cc

The carbon pill may have a conductivity of about 16-140 mS/m

The carbon pill may include a lubricant additive material for aiding the flow and compression of the first carbon material.

The carbon pill may provide that the lubricant additive includes at least one of the group comprising microcrystal-line cellulose, dicalcium phosphate, magnesium stearate, and silicon dioxide.

The carbon pill may provide that the carbon pill has a shape belonging to the geometrical group of: cylinder, disk, rectangle, hexagon, polygon, donut-like shape and their combination thereof.

The carbon pill may provide that the shape includes at least one hollow structure connecting one side of the carbon pill to the other side of the pill.

The carbon pill may provide that the shape includes the group of hollow cylinder, hollow disc, hollow hexagon.

The carbon pill may provide that at least one end side of the carbon pill is predominately flat.

The carbon pill may provide that at least one end side of the carbon pill belongs to the group of concave and convex surfaces.

Turbostratic graphene may be synthesized from the carbon pill.

According to some embodiments, provided is a device for converting a carbon pill into graphene which includes at least two electrodes. The electrodes operate at high temperatures. The electrodes are configured to support a carbon pill. The device includes a power supply connected to the electrodes for passing a current through the electrodes to convert the carbon pill into graphene.

The device may provide that the electrodes include at least two parts. At least one part is metal and at least a second part is graphite.

The device may provide that the metal part is a high temperature metal from the group comprising brass, copper, tungsten, titanium, stainless steel, stainless steel allows, molybdenum, tantalum, nickel, an alloy, and combinations thereof.

The device may provide that the second part is a high temperature material of metal carbides.

The device may provide that the electrodes operate at temperatures above 1000° C.

The device may provide that the electrode has a shape belonging to the geometrical group of cylinder, disk, rect-angle, hexagon, polygon, cone, flat cone and combinations thereof.

The device may provide that the side of the electrode that is supporting the carbon pill is predominately flat.

The device may provide that the side of the electrode that is supporting the carbon pill comprises at least one of a concave surface and a convex surface.

The device may provide that the electrodes further com-prise a clamp that is configured to pass a high density current from a flat surface electrode to a cylindrical surface elec-trode.

The device may provide that the device is enclosed inside an enclosure.

The device may provide that the enclosure is under vacuum.

The device may provide that the enclosure is filled with a gas from the group of nitrogen, argon, helium, oxygen, and combinations thereof.

The device may provide that the enclosure is made from the group of materials including plexiglass, polycarbonate, polyvinyl chloride, aluminum, and stainless steel.

According to some embodiments, provided is a method for synthesizing graphene which includes compressing a carbon pill in between two electrodes. The carbon pill includes at least one carbon material, at least one powder binding material, and at least one conductivity improvement material. The method also includes applying an electric current to the pill. The method also includes converting predominately the at least one carbon material to graphene.

According to some embodiments, provided is a tur-bostratic graphene material wherein the turbostratic gra-phene is synthesized by joule heating a carbon pill.

The turbostratic graphene may provide that the carbon pill includes at least one carbon material and at least one binding material.

The turbostratic graphene may provide that the carbon pill includes at least carbon material and at least one conduc-tivity improvement material.

The turbostratic graphene may provide that the carbon pill includes at least one carbon material, at least one binding material, and at least one conductivity improvement mate-rial.

Other aspects and features will become apparent, to those ordinarily skilled in the art, upon review of the following description of some exemplary embodiments.

BRIEF DESCRIPTION OF THE DRAWINGS

The drawings included herewith are for illustrating vari-ous examples of articles, methods, and apparatuses of the present specification. In the drawings.

DETAILED DESCRIPTION

Figure 1:
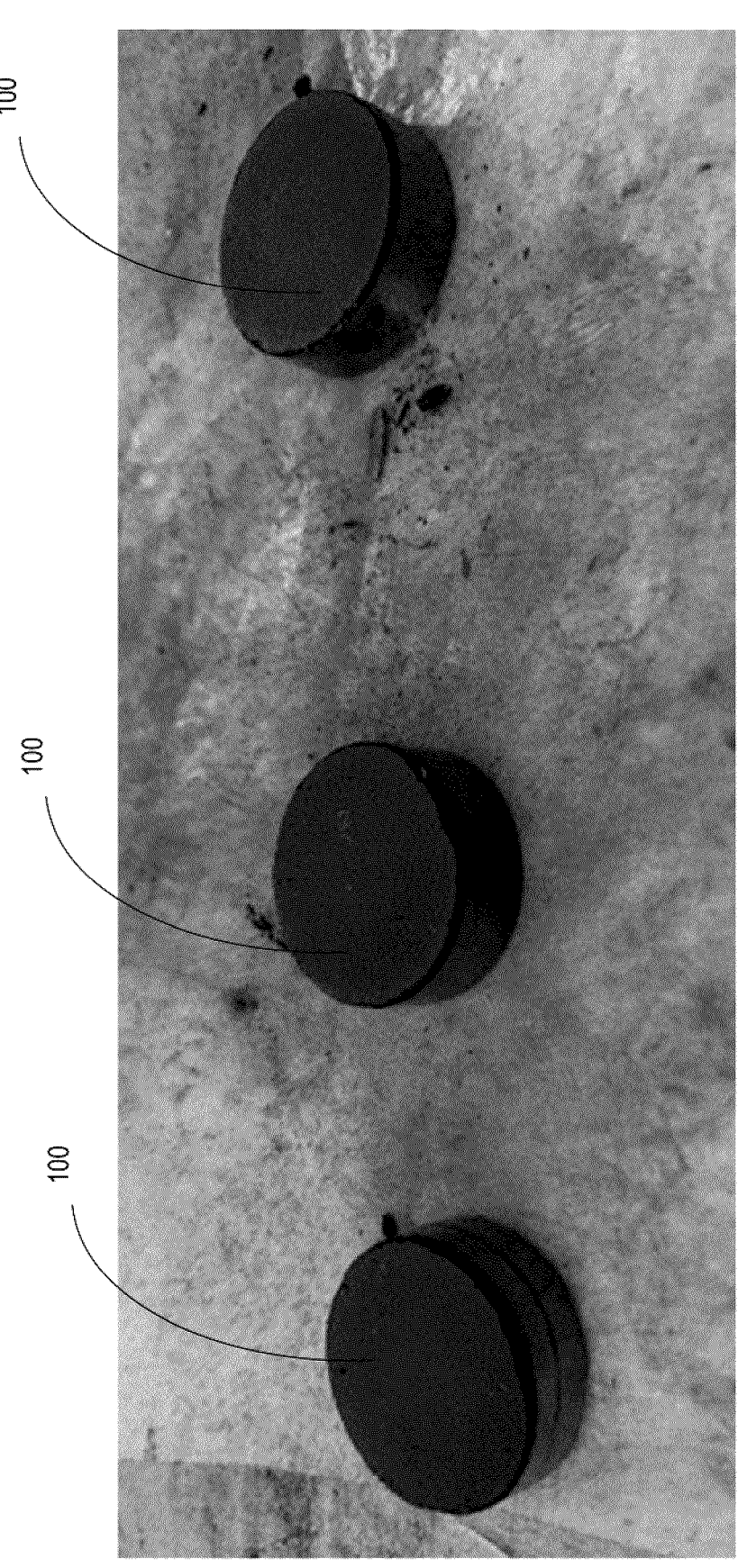
FIG. 1 illustrates a perspective view of a carbon pill produced by compressing the first carbon material and second material with a pressing tool, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Provided herein is a carbon pill that may be easily stored, transported and processed, and does not need confinement, according to an embodiment. The carbon pill is suitable for joule heating and converting the carbon in the carbon pill into graphene.

Provided herein is a device for converting the carbon pill into graphene which includes heat resilient electrodes and compression springs that may hold the pill in place without additional support and confinement and may apply voltage to the pill, according to an embodiment.

Provided herein is a method of synthesizing graphene from a carbon pill into graphene by joule heating the pill at temperatures of 2800 to 3000 C, according to an embodiment. The method of synthesizing graphene from a carbon pill generates predominantly few-layer turbostratic graphene. The turbostratic graphene is graphene layers which are misorient with respect to each other. The layers are therefore not AB stacked. The graphene layer configuration of turbostratic graphene allows for easier dispersion of the graphene powder in liquids. Easier dispersion of graphene enables fabrication of better graphene composites.

Turbostratic graphene refers to a graphene that has little order between the graphene layers. Other terms which may be used include misoriented, twisted, rotated, rotationally faulted, and weakly coupled. The rotational stacking of turbostratic graphene helps mitigate interlayer coupling and increases interplanar spacing, thereby yielding superior physical properties relative to competitive graphene structures when compared on a similar weight basis. The subtle difference in adjacent layer stacking orientation expresses itself with important differences in product performance attributes. An important performance benefit evident with turbostratic graphene is that multi-layer graphene structures separate into few and individual graphene layers more easily and the graphene layers tend not to recouple. The turbostratic nature of a graphene may be observed and confirmed by Raman analysis.

A flash joule heating synthesis method and compositions thereof are described in Patent Cooperation Treaty Application having International Publication Number WO 2020/051000 A1 to Tour et al., having an international publication date of Mar. 12, 2020, which is herein incorporated by reference in its entirety.

Example 1—Carbon Pill for Graphene Conversion

Provided is a carbon pill is for graphene conversion which includes a first carbon material for synthesizing to graphene by joule heating. The first carbon material is compressed from a powder form into a pill form. The carbon pill also includes a second material for binding the first carbon material from a powder form into a pill form or improving conductivity of the first carbon material.

Referring to Table 1, parameters for an embodiment of a carbon pill for graphene conversion are shown.

TABLE 1

| Carbon pill parameters. | |
|---|---|
| Parameter | Quantity |
| Outer Diameter (mm) | 10-22 |
| Mass (g) | 1-10 |
| Thickness (mm) | 4-40 |
| Compression Force (metric tons) | 2-5 |
| Compression Time | 1 sec to 1 min |
| Pill Resistance (Ohms) | 1-500 |
| Force in Jig (N) | 20-100 |
| Powder Grain Size (microns) | 20-600 |

The first carbon material may include a substance capable of being converted into graphene via joule heating. The first carbon material for fabricating the carbon pill for graphene conversion via joule heating includes any one or more of green petroleum coke, calcinated petroleum coke, carbon black, carbon black from recycled tires, metallurgical coke, coal, anthracite coal, ash from recycled plastic, spent coffee grains, and any combination thereof.

The first carbon material may be compressed into a pill with the help of a die and press without any other material additives. Example materials includes green pet coke and spent coffee grounds. Accordingly, some materials may be both the first carbon material and the second binding material.

Some forms of carbon materials do not stick together well and the pill does not have a mechanical strength to be handled. A second material for binding the first carbon material may be added to the carbon powder before compressing it into a pill to aid its form shaping and retention. Some binders include lignans or lignan containing materials, such as coffee.

The first carbon materials may be compressed into a pill but do not have enough electrical conductivity to be joule heated at voltages in the range from 90V to 600V and may require higher voltage that is not practical. A second material for improving the conductivity of the first carbon material may be added to the carbon powder before compressing it into a pill. The conductive additive material includes any one or more of carbon black, tire carbon black, calcinated petroleum coke, metallurgical coke, single and multi walled carbon nanotubes, graphene and any combinations thereof.

Where the first carbon material may not stick together well and may not have enough electrical conductivity to be joule heated easily, a second material that is a binder material is added to help form a pill and another material that is a conductive additive material is added to increase the pill's electrical conductivity. The first carbon materials include any one or more of plastic ash, pyralyzed plastics, and raw ground plastic powder.

Dopant impurities may intentionally be added to the pill to form an enhanced graphene material. Dopants include any one or more of Fe, Ni, B, or F (via compound). Some examples of enhanced properties include magnetism, thermal and electrical conductivity, and functionalization.

Referring to Table 2, provided herein is a list of carbon materials, binders, and conductive additives, and their mass utilization in a carbon pill for graphene conversion.

TABLE 2

Composition for an embodiment of a carbon pill.

| Component | Use Case | Mass Fraction Utilized (%) |
|---|---|---|
| Petroleum Coke (Raw, Calcined) | Carbon material, Conductor | 30-99 |
| Tire Carbon Black (Raw, Pelletized)* | Carbon material, Conductor | 5-90 |
| Metallurgical Coke | Carbon material, Conductor | 30-70 |
| Plastic Ash* | Carbon material | 30-45 |
| Coffee Grounds* | Carbon material, Binder | 10-90 |
| Anthracite Coal | Carbon material | 75 |
| Carbon Black (various brands) | Conductor | 1-20 |
| Turbostratic Graphene | Conductor | 1-10 |
| Carbon Nanotubes | Conductor | 0.1-5 |
| Corn Starch* | Binder | 0-10 |
| Pine Bark* | Binder | 5-30 |
| Polyethylene Microwax | Binder | 0-5 |
| Wax (various brands) | Binder | 0-20 |
| Chemplex 690 | Binder | 0-25 |
| Cellulose* | Binder | 0-10 |
| Naphtenic Oil | Binder | 0-6 |
| Gilsonite | Binder | 0-5 |

*Natural or recycled carbon material may be used

A method of producing a carbon pill is provided which includes placing the first carbon material and second material into a die space in a powder form. The method also includes compressing with a pressing tool the first carbon material and second material from a powder form into a pill form.

Referring to FIG. 1, illustrated therein is a carbon pill 100 produced by compressing the first carbon material and second material with a pressing tool, according to an embodiment. The carbon powder is compressed into a pill form which is suitable for joule heating with the help of die and punch and a hydraulic press.

A carbon based powder and binder proportions may be measured with high precision scale. Each of the carbon and the binder are first ground with mortar and pestle for few minutes, individually and together. For large scale operation a ball mill is used to mill the powders from mm to 5 microns particles. The powders are mixed together to form uniform mix and are loaded into the die. Afterwards, the pin is inserted into the die and the set is inserted under the head of a hydraulic press. The hydraulic press applies a pressure from 2 to 10 metric tons and hold that pressure for 1 sec to 5 min to form the pill. Afterwards the carbon pill is expunged from the die.

In an embodiment, the pill graphene conversion needs to be stored, handled and moved around without fracturing. The preferred pill dimensions may be 10 to 20 mm diameter and lengths from 4 to 50 mm. The preferred pill density may be about 0.7 to 1.4 g/cc. The pill may have conductivity of about 16 to 140 mS/m (2 to 20 Ohms over pill length). The pill may withstand about 2 to 10 kg (20 to 100 N) of clamping force before it is processed. The pill may be heated up to 600 C for few seconds, multiple times, without disintegrating.

Example carbon powders which may the first carbon material for the pill include, without limitation, carbon black, tire carbon black, pet coke (green and calinated). Example second materials for binding the first carbon material of the pill include, without limitation, coffee, pine bark, Green pet coke, PE microwax, wax, and commercial carbon binder Chemplex 690.

A carbon powder grain size of 100 to 200 microns may be used for the pill. The pill composition may includes 80% of the first carbon material and 20% of the second material for binding the first carbon material.

Figure 2B:
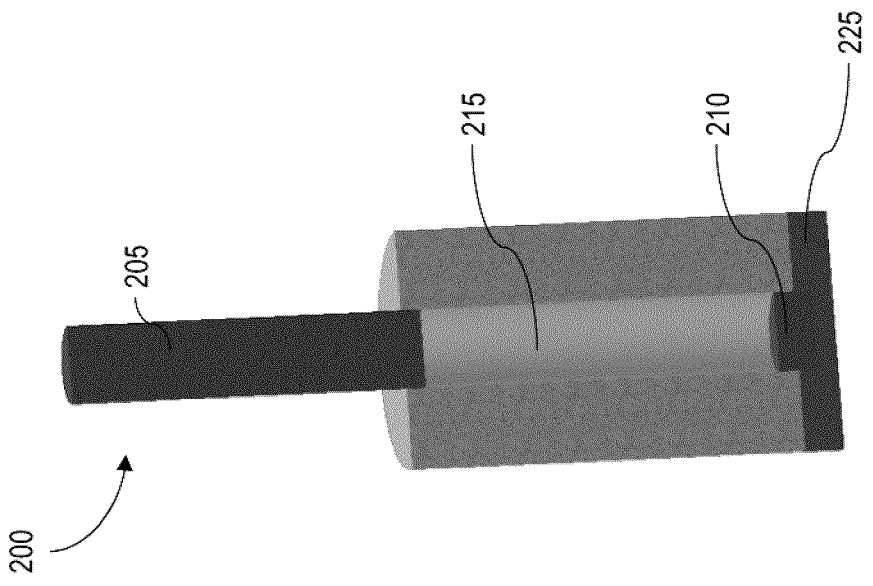
FIG. 2B illustrates a cross sectional view of the press, according to an embodiment.
Figure 2A:
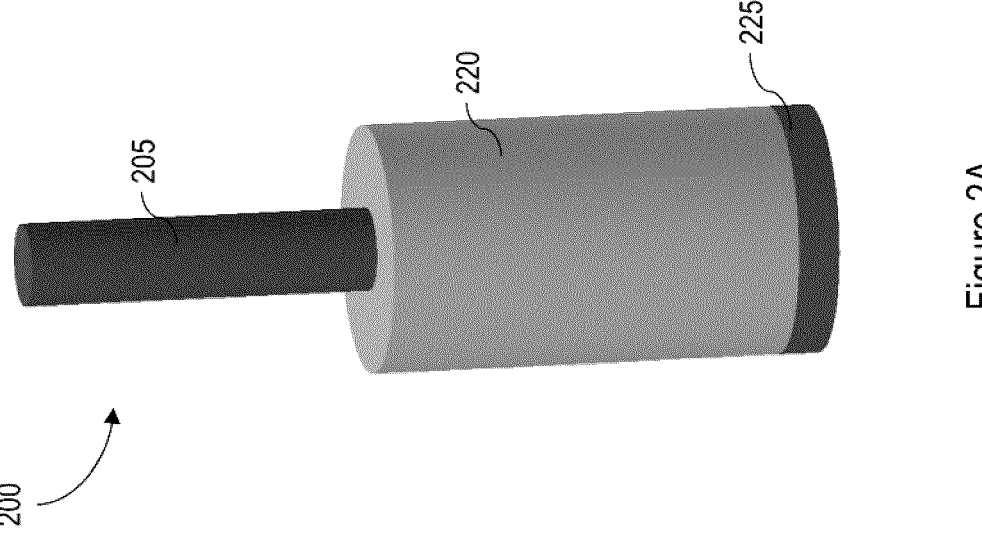
FIG. 2A illustrates a front view of an embodiment of a press for making high aspect ratio carbon pills.

Referring to FIG. 2A, illustrated therein is front view of an embodiment of a press 200 for making high aspect ratio carbon pills. FIG. 2B illustrates a cross sectional view of the press 200, according to an embodiment. A 20 mm die 205 that is used to press a 20 mm outer diameter carbon pill 210, with a high outer diameter to length aspect ratio from 1:0.5 to 1:5.

The press 200 includes a die space 215 where the first carbon material and second material are be placed in. The space 215 is encased by walls 220 which prevent the powder from escaping while being pressed. The pill is pressed between the pin 205 and the base 225.

The pressing force to make a carbon pill 210 is between 1 metric ton to 12 metric Ton force per cm² of compressed area. The optimal compression force is about 5 metric Ton force per cm².

Figure 3:
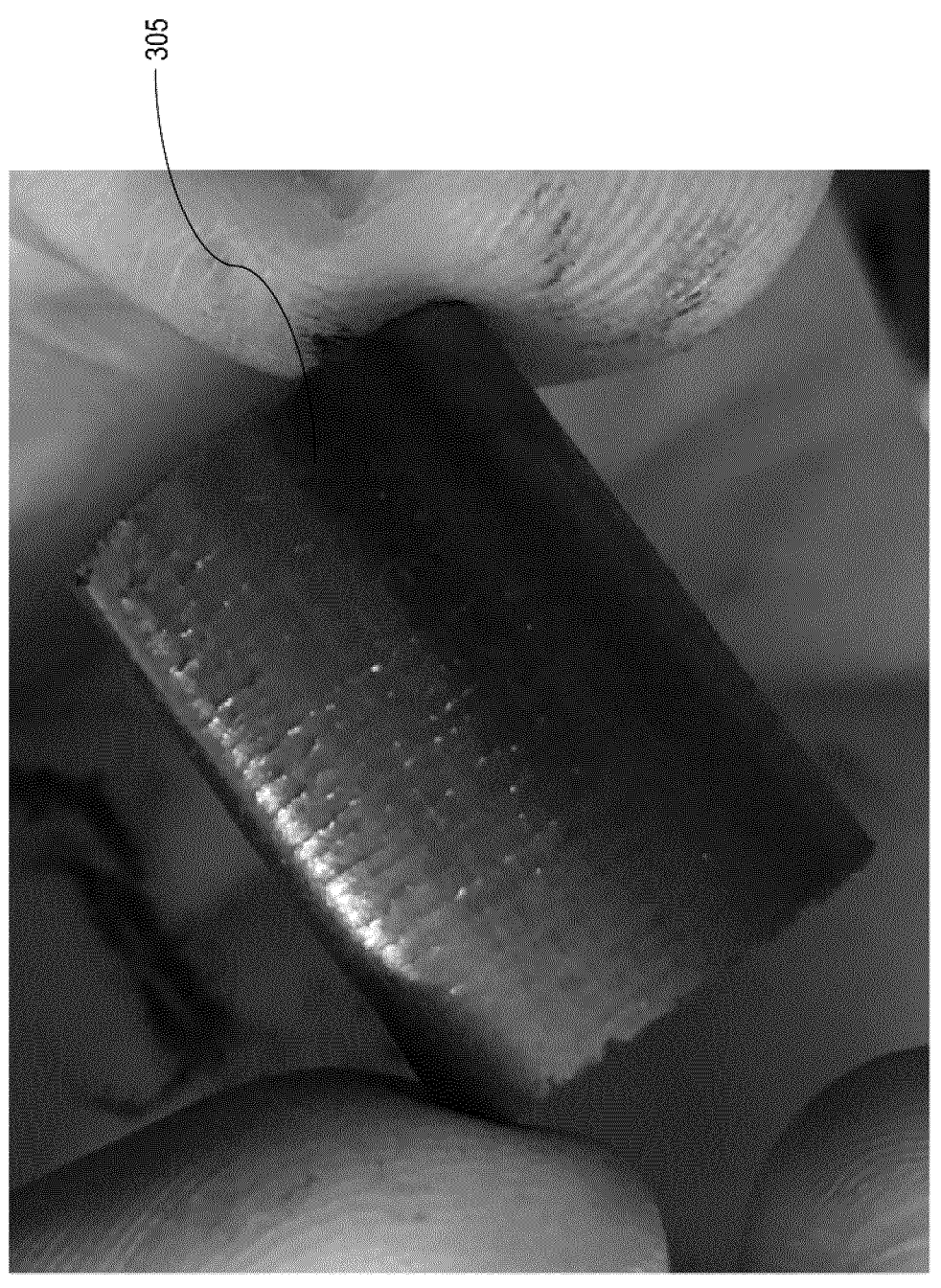
FIG. 3 illustrates a carbon pill 305 with a 15 mm outer diameter made from 30% binder and 70% carbon-based material using the press of FIGS. 2A and 2B, according to an embodiment.

Referring to FIG. 3, illustrated therein is a carbon pill 305 with a 15 mm outer diameter made from 30% binder and 70% carbon-based material using the press of FIGS. 2A and 2B, according to an embodiment. The carbon pill 305 has a resistance of about 100 Ohms to 1 KOhms, depending on the composition of the pill material and the compression force.

The carbon powder may be compressed into a pill, suitable for graphene conversion by joule heating, with the help of die and punch and a vice. In one example, a die and punch set that is normally used with a pharmaceutical pill making machine was used to make the carbon pill. A 10 mm inner diameter set was used. The pins in the set have an oval (spherical cup) ends to make the compressed pill oval.

As starter material a finely ground coffee, such as Turkish style ground coffee, was used to make coffee. Subsequently, the used coffee ground may be baked at 400° F. for few hours to remove the moisture. The dried coffee was mixed with 10% wt. of carbon black and mixed in mortar for fine blending.

Figure 4:
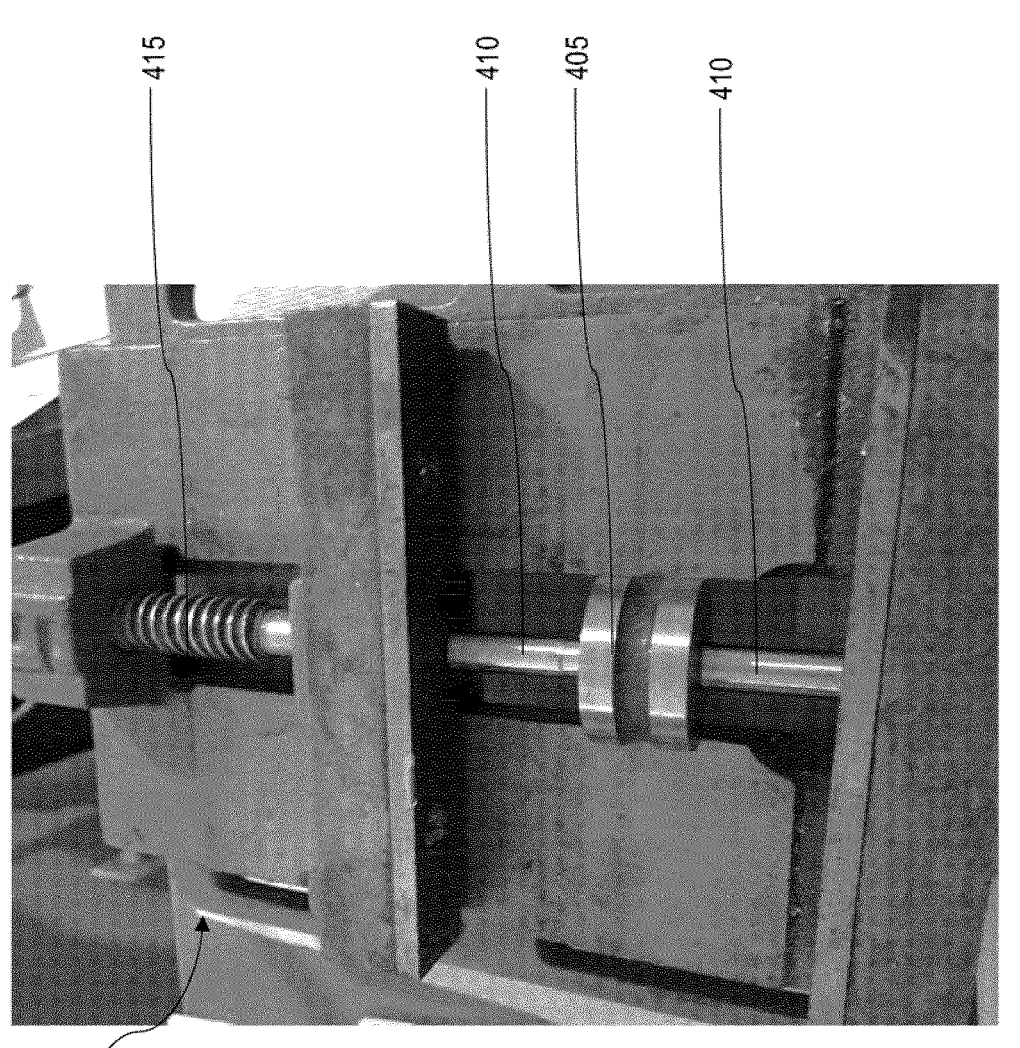
FIG. 4 shows a device for making a carbon pill is shown, according to an embodiment.
Figure 4:
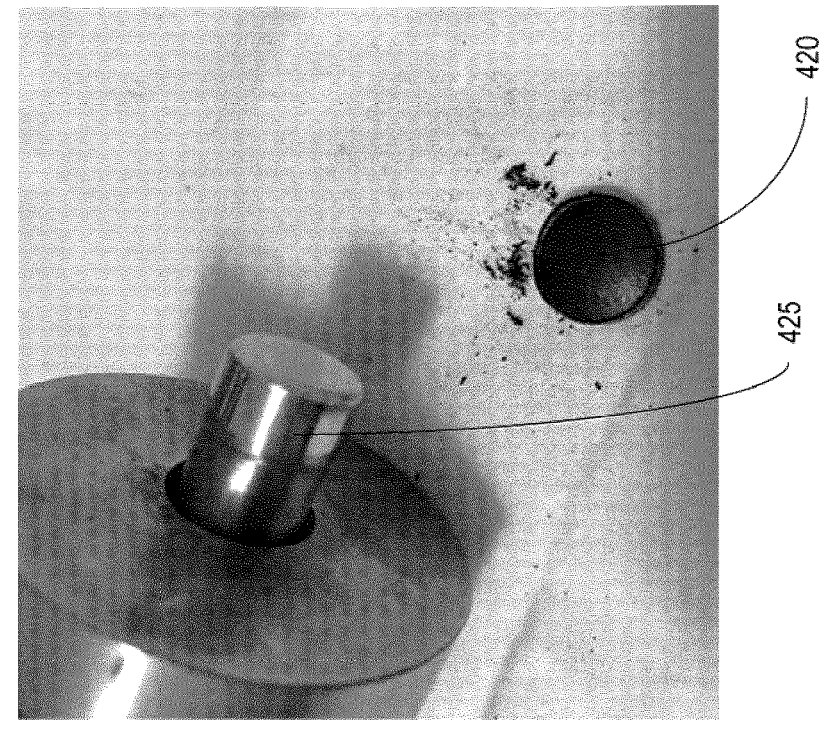

Referring to FIG. 4, a device 400 for making a carbon pill is shown, according to an embodiment. The powdered carbon material is poured into the die 405 and blocked with 2 pins 410. The assembly is compressed using a machine shop vice 415. The force of compression is estimated to be about 250 kg (2500 N). The carbon pill 420 is produced from the compression of the carbon material and second material. For 200 mg of material, the carbon pill that is produced is about 3.5 mm height and about 10 mm outer diameter. Carbon pills 420 produced manually are produced at a much slower rate when using an automatic pressing a machine. For commercial production a machine that compresses a pill, may be used. A die set with 6 mm diameter to 25 mm diameter may also be used.

In some embodiments, an automated machine is used for compressing the carbon pill. The automated machine is a motorized, single punch machine, that may be operated in manual mode and automatic with rate of 2000 tablets per hour. The operation is fully mechanical with top and bottom cams driving the top and bottom pistons in sync. The electrical motor provides power to turn the crank. The pressure of the piston may be adjusted from zero to 5 tons. The tablet die may be 6 mm deep and up to 20 mm in diameter.

During the dispensing of a powdered material in a typical tablet making process, the powder flow is via gravity and shaking and is very efficient. The dispensing arm tightly slides over the hole to filled and moves back and forward. The space does not overfill because the arm will swipe the extra material without losing powder.

Flow and compression sticking of the material are the powder properties which may be adjusted when producing a pill. An advantage for better powder dispensing would be to utilize a custom CAM to do more powder shaking and make sure the die is completely filled with powder before compression. A stepper motor may also be used with encoders to drive the motor and use the existing CAM to add custom process control. With a stepper motor automation may be added to a very mechanical system.

In some embodiments, a fresh, dry binder, such as ground coffee, may be compressed into a tablet with 5 tons of pressure without any additives and may be handled well and stored in a zip lock bag and transported. The coffee tablet is still porous and may be crumbled with strong hand pressing.

A coffee-based carbon pill with some ambient moisture may also be compressed into a tablet with 5 tons of pressure without any additives. The coffee-based carbon pill with some ambient moisture compresses slightly better than a dry coffee powder but the pill may stick to the die and the powder flow is not as good as dry powder.

In an embodiment, the first carbon material is a powder which is dried on ambient or vacuum oven, stationary or with mixing arm, so as to remove or reduce moisture in the powder and enable better powder flow and therefore faster pill fabrication.

Figure 5:
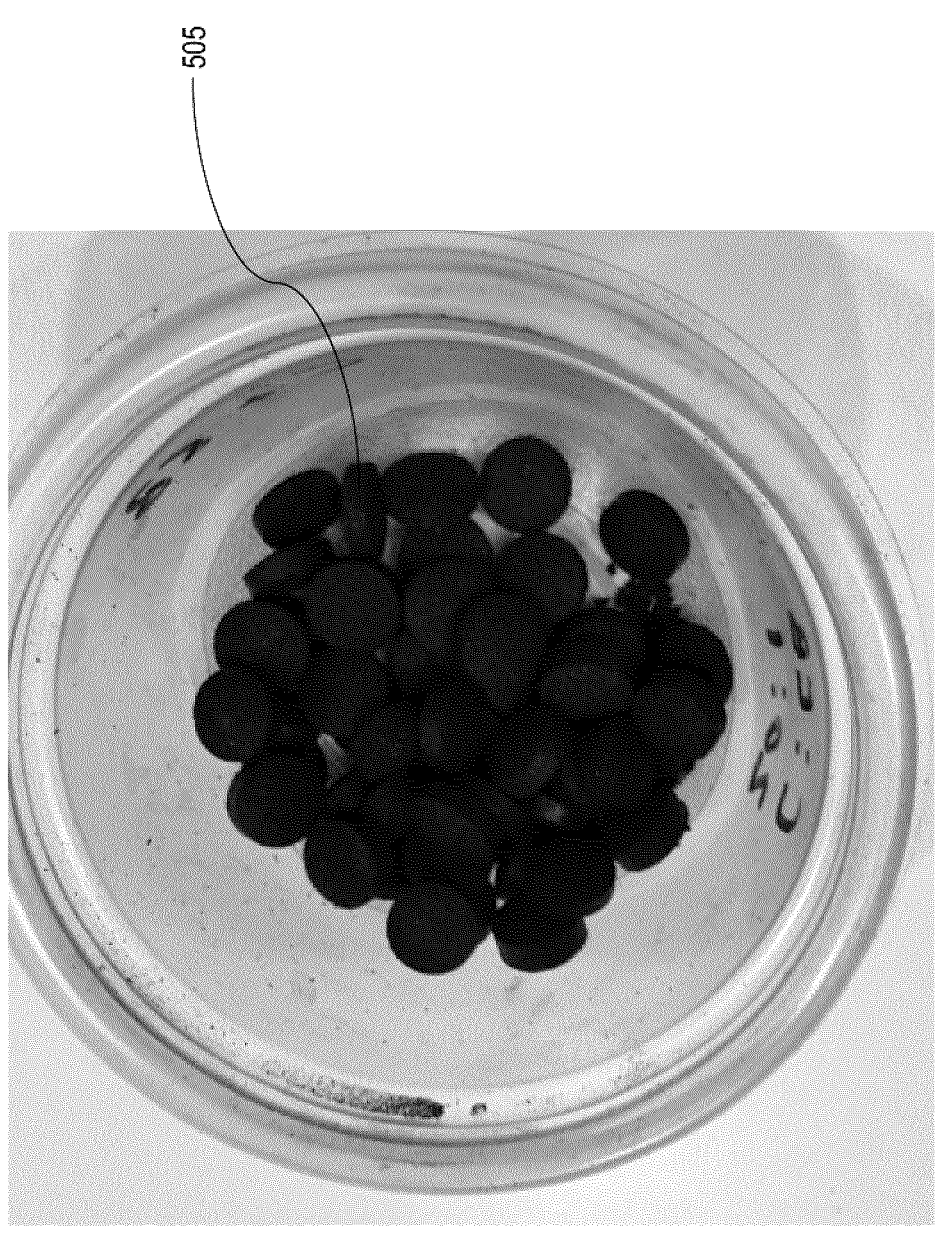
FIG. 5 shows a top down view of carbon pills produced by an automatic pill pressing machine, according to an embodiment.

Referring to FIG. 5, illustrated therein are carbon pills 500 produced by an automatic pill pressing machine, according to an embodiment. The carbon pills 500 is made with an automatic pill pressing machine using 95% not dry coffee and 5% carbon black. The compression with carbon black is easier that the 100% coffee powder. A higher carbon black mass percentage allows for better compression of the carbon pill. The coffee-carbon black powder flow is improved over 100% coffee and less force is required to press the coffee-carbon black powder into a pill. The carbon pills 500 have a 10 mm diameter and a 5 mm height. The mass of each pill is between 0.25 grams to 0.4 grams. The pill resistance after compression is about 1.2 kOhms. The pill resistance may be reduced by increase the conductivity of the powder, such as by increasing the percent weight of carbon black in the powder mixture. An optimal pill resistance is between 20 ohms to 1 kOhm.

The automatic pill pressing process may also be applied to any other types of carbon materials suitable for graphene conversion and any combination of such materials thereof. Further, the automatic pill pressing process may be applied to any combination of the components listed in Table 1.

Additives to aid the flow (lubrication) and compression of pill, such as the additives used in the food industry, may also be used for making carbon-based pills for making of graphene via joule heating. The lubricant additive materials which may be used in the carbon pill includes, without limitation, microcrystalline cellulose (MCC), dicalcium phosphate, magnesium stearate, and silicon dioxide. A combination of lubricant additives may be used or a single lubricant additive, such as MCC, may be used. Starch may also be used as a binder and lubricant additive material. For example, 5% by weight fraction may be a lubricant additive material to add to the powder flow.

The compression of trapped air in the powder exerts pressure on the die. To avoid the stress on the die, there are 2 punch machines, the 2 punch machines first pre-compress the powder and then compress the pre-compressed powder into tablets. The 2 punch machines measure the compression and have pre and main compression steps. In some embodiments, using 2 punch max throughput machines outputs 15,000 tablets per hour.

By controlling the air pockets with a dual compression, and therefore reducing the stress on the die, in some embodiments, a stainless-steel die may be replaced with a quartz die and therefore joule heating of the carbon-based material is performed during the compression. The joule heating step may alternatively be performed after the compression.

An example a high speed pill making machine is able to produce 200.000 carbon pills per hour. Where each tablet produced by the machine is 0.25 grams and the joule heating process matches the machine's pill output, the process may produce about 50 kg of graphene per hour.

Figure 6:
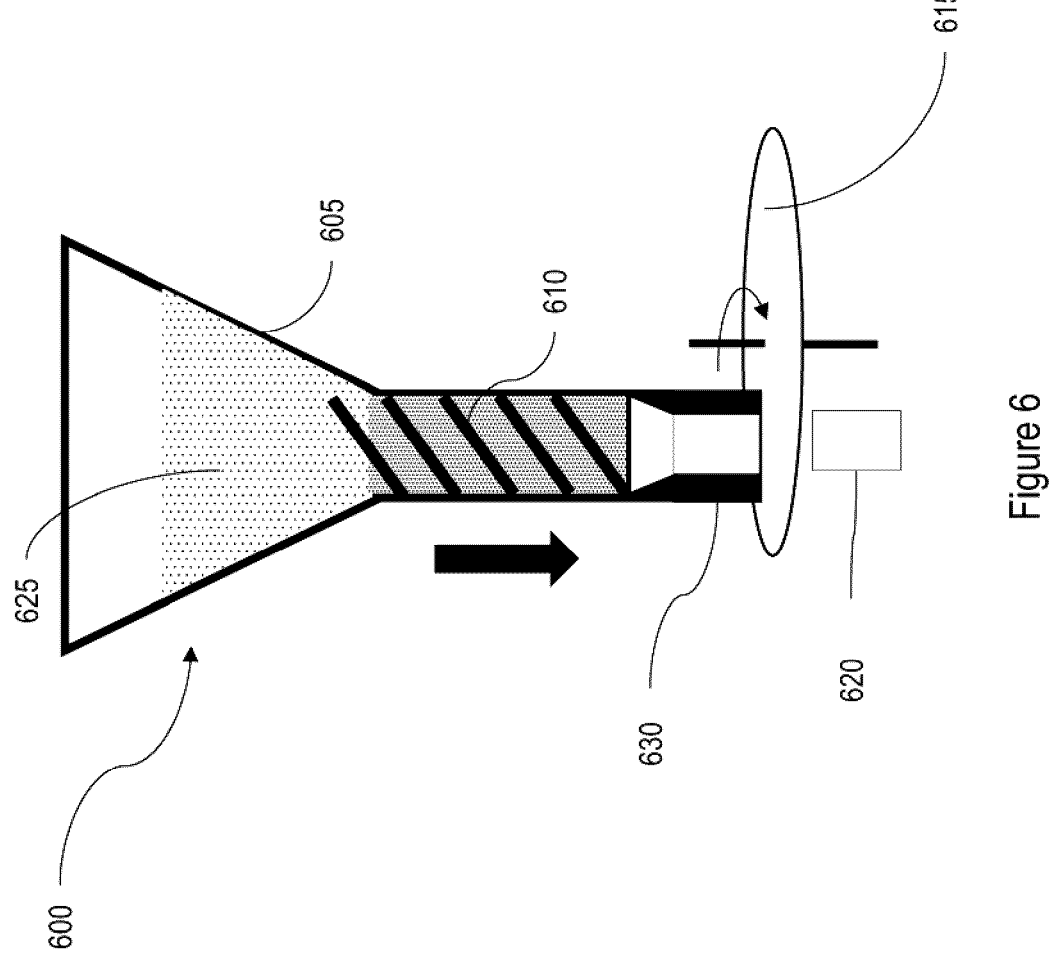
FIG. 6 illustrates a device for producing a carbon pill through an extrusion process is shown, according to an embodiment.

Referring to FIG. 6, illustrated therein is a device for producing a carbon pill through an extrusion process is shown, according to an embodiment. The powder 625 is loaded into a funnel 605 to a powder extruder 610 in a continuous manner. The extruder 610 compresses the powder 625 and ejects the material via a nozzle 630 or die at the desired dimensions, the carbon pill 620 is cut to a specific length using a rotating blade 615.

The carbon pills may be any shape wherein the carbon powder is compressed. In some embodiments the carbon pill is cylindrical with a circular cross section and flat ends. In another embodiment the pills are rectangular with a rectangular cross section. In another embodiment the carbon pill is brick-like. In another embodiment the carbon pill has at least one hole in the middle. In another embodiment the carbon pill has holes distributed thought the cross section. The purpose of the holes is to enable more uniform heat distribution and gas escape routes. The pill may be a hollow disk for example. The pill ends may be, without limitation, flat, concave, convex, or may have conical termination for better pill clamping.

Example 2—Device for Converting a Carbon Pill
into Graphene

Provided herein is a device for converting a carbon pill into graphene which includes a space between at least two conductive surfaces. The conductive surfaces are configured to support a carbon pill in the space. The device includes at least two electrodes electrically coupled to the at least two conductive surfaces. The device also includes a power supply connected to the electrodes for passing a current through the electrodes to convert the carbon pill into graphene.

In some embodiments, the device also includes a shield positioned to surround the space configured to block deflected powder from the carbon pill without contacting the carbon pill. The shield may be made from quartz. The device may also include a force sensor for detecting compression force applied to the carbon pill and a resistance sensor for measuring electrical resistance of the carbon pill, during loading and during processing.

In some embodiments, the two conductive surfaces are coupled to compression springs to apply compressive force to the conductive disks and suspend a carbon pill in the space. The conductive surfaces may be graphite disks.

The device may be used for producing turbostratic graphene by joule heating a carbon pill.

In some embodiments, the device for converting a carbon pill into graphene includes graphite-based heat resilient electrodes and compression springs that hold the pill in place without additional support and confinement and apply voltage to the pill. This disclosure also discloses a process that converts a carbon based pill into graphene with the help of Joule heating the pill.

Figure 7:
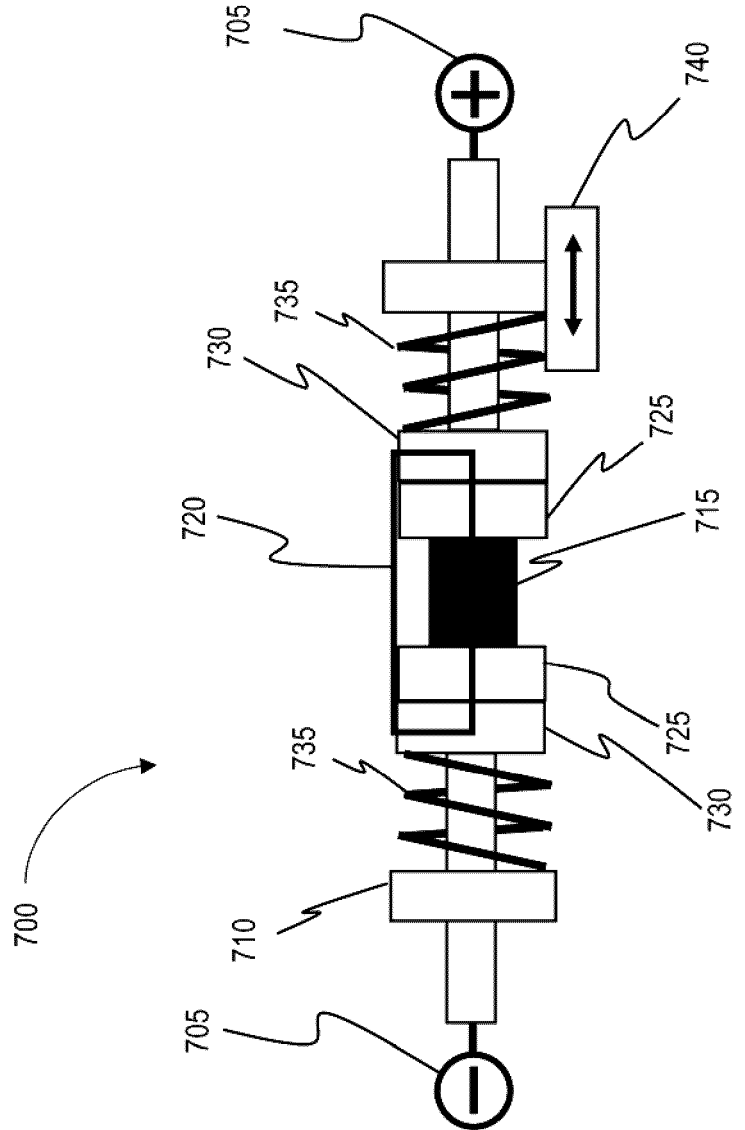
FIG. 7 illustrates a side view of a device for converting a carbon pill into graphene, according to an embodiment.

Referring to FIG. 7, illustrated herein is a device 700 for converting a carbon pill 715 into graphene, according to an embodiment. The carbon pill 715 is suspended by two spring-compressed graphite electrodes 725 that withstands high temperatures and have excellent electrical conductivity. The graphite material does not contaminate the graphene produced during the joule heating even at temperatures as high as 3000° C. The graphite electrodes 725 get their electrical power from the brass electrodes 730 that slide freely through a set of rod bearings 710, 740. One of the rod bearings 710 is grounded and the other rod bearing 740 is sliding. The set of compression springs 735 pushes off the bearings 710, 740 and pushes the brass 730 and the graphite electrodes 725 to compress the carbon pill 715. While the device 700 is shown using compression springs 735 to suspend the carbon pill 715, any mechanism may be used which is sufficient for suspending the carbon pill during joule heating. The device may also be referred to as an electrical vice.

The joule heating process that converts carbon into graphene lasts from 1 ms to 5 sec and during that time the peak temperature reaches up to 3000° C. for 1 to 100 ms. However, due to the radiation cooling most of the pill heat is dissipated into the ambient environment and the other components of the device 700, except for the graphite electrodes 725 that are in direct contact to the pill 715. The other components of the device may reach peak temperatures from 200° C. to 1500° C. Therefore, the other parts of the device do need to be rated at high temperatures.

A power supply 705 provides power to the device 700 for joule heating the carbon pill 715. The device 700 also includes a shield 720 which is a half quartz tube.

In some embodiments, the body of the device 700 is made from 3D printed plastic parts and utilizes linear stage to move one electrode with respect to other with predetermined force. The pill 715 clamping force is adjusted with a set screw and may be monitored using a disk force sensor. The device 700 also has a shield 720 which is a quartz tube that is not in contact with the carbon pill 715 and its purpose is to collect any flying powder that occurs during the joule heating process that converts the carbon pill 715 into graphene.

As the protective quartz tube is not in contact with the carbon pill 715, the quartz tube does not degrade and may be used multiple times. In some embodiments, the quartz tube is replaced with half quartz tube. The half quartz tube is longitudinally cut, and deflects any powder that flies off the carbon pill 715 into a downward direction and into a collection bin (not shown). The bottom part of the carbon pill 715 is open to the collection bin.

Figure 8:
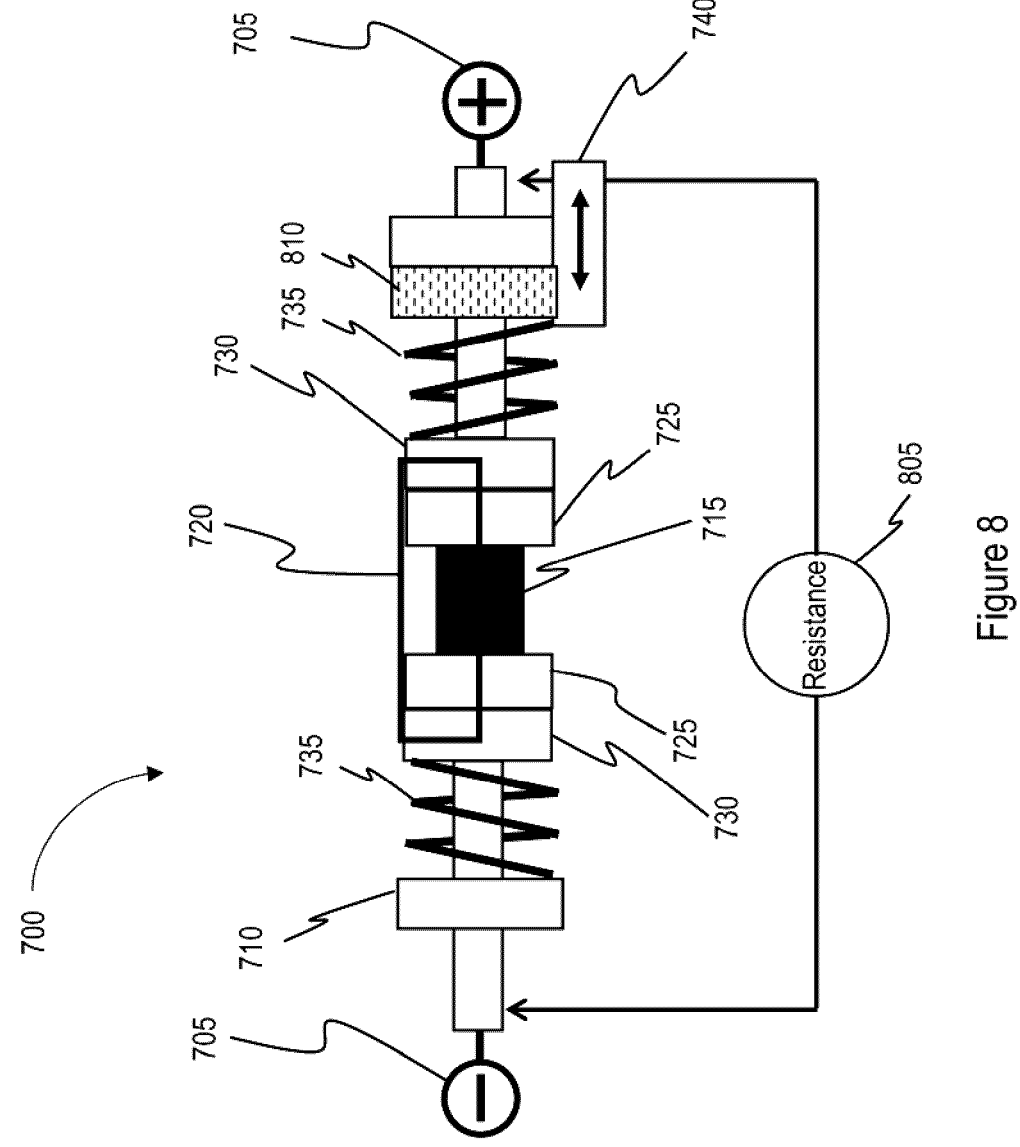
FIG. 8 illustrates a side view of a device for converting a carbon pill into graphene including a force sensor and resistance sensor, according to an embodiment.

Referring to FIG. 8, illustrated herein is a device 700 for converting a carbon pill 715 into graphene including a force sensor 810 and resistance sensor 805, according to an embodiment. The force sensor 810 may be, without limitation, a disk force sensor that is sandwiched between the sliding bearing 740 and the compression spring 735. As the sliding bearing 740 is compressing the spring 735, the force sensor 810 in between detects the force applied to the carbon pill 715.

The pill 715 is compressed with a force in the range of 20N to 100N. In addition, the device incorporates a resistance sensor 805 that measures the carbon pill's 715 resistance as a function of pill compression force. In some embodiments, the resistance sensor 805 is isolated from the high power circuit via manual or automatic switches to protect the circuit from the high power. The pill resistance may be measured before the process, in between process steps, and after the joule heating conversion. The pill resistances range from 1 to 500 Ohms. The presence of force sensor 810 and resistance sensor 805 allows the device 700 to be automated. In one automation example, a motor slides the bearing 740 until a desired force or resistance are achieved.

In some embodiments, the carbon pill can be multiple carbon pills that are stacked together to make a larger mass and therefore speed up the graphene production. For example, five 1 g carbon pills may be stacked together to make a combined 5 g carbon pill sample. The carbon pills may be in contact with each other or a graphite disk electrode may be inserted between them to better distribute the heating profile.

The joule heating of a carbon pill may be done in air, in a vacuum chamber, or in a gas chamber filled with oxygen, nitrogen, argon, fluorene, or other gasses that enhance the properties of the resulting graphene.

Example 3—Method for Synthesizing Graphene

Figure 9:
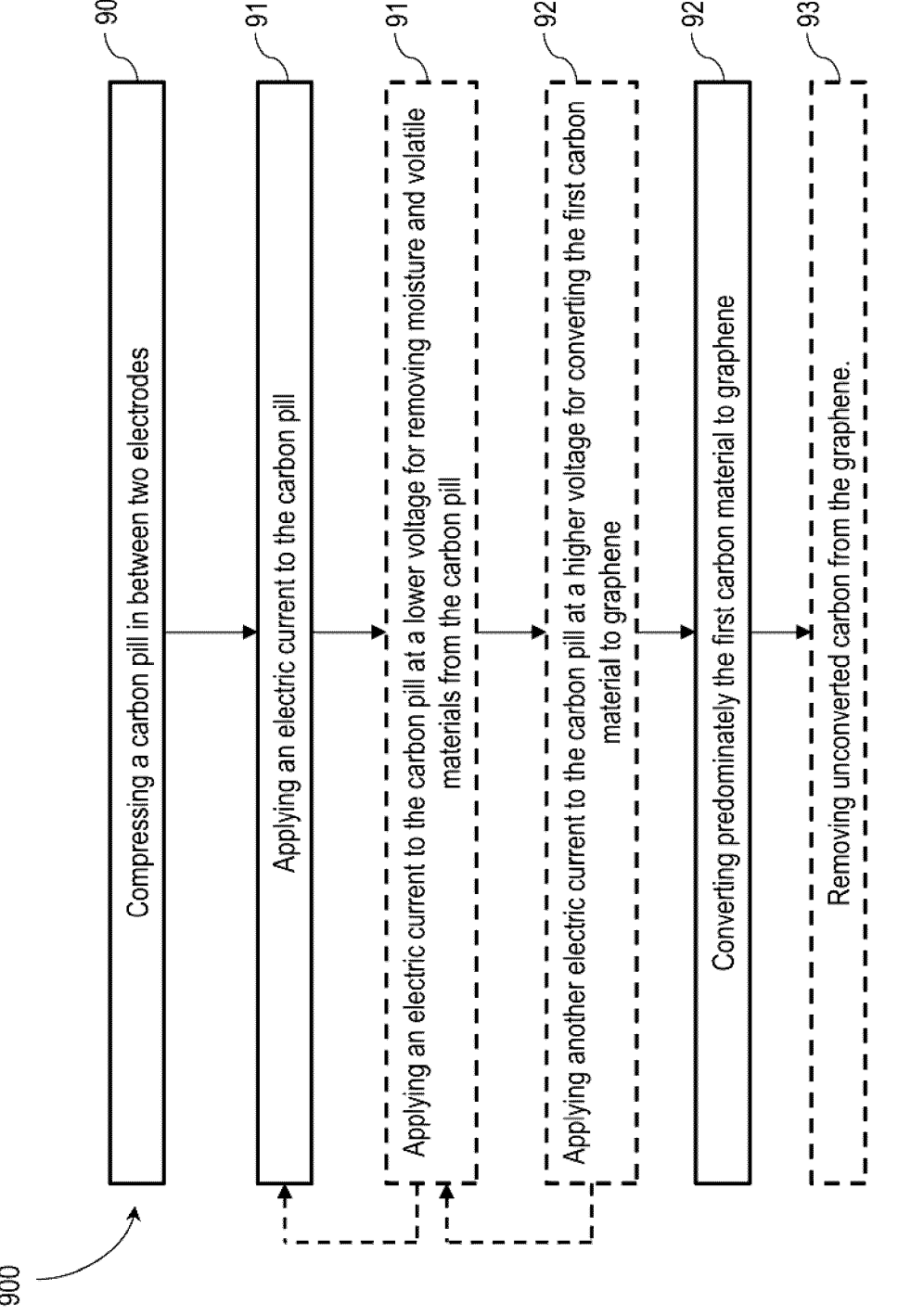
FIG. 9 illustrates a flowchart demonstrating a method for synthesizing graphene, according to an embodiment.

Referring to FIG. 9, illustrated therein is a flowchart demonstrating a method 900 for synthesizing graphene, according to an embodiment. The method 900 includes compressing a carbon pill in between two electrodes, at 905. The carbon pill includes a first carbon material for synthesizing graphene by joule heating and a second material for at binding the first carbon material from a powder form into a pill form or improving electrical conductivity of the first carbon material.

The method 900 also includes applying an electric current to the carbon pill, at 910.

The method 900 also includes converting predominately the first carbon material to graphene, at 930.

The method 900 may optionally include applying an electric current to the carbon pill at a lower voltage for removing moisture and volatile materials from the carbon pill, at 915. Applying the lower voltage electric current, at 915, may optionally be repeated until all moisture and volatile materials are removed from the carbon pill.

The method 900 may optionally include applying another electric current to the carbon pill at a higher voltage for converting the first carbon material to graphene at 920. Applying the higher voltage electric current, at 920, may optionally be repeated until all the carbon material is converted into graphene.

The method 900, may optionally include removing uncovered carbon from the graphene, at 930.

In some embodiments, a 1 g carbon pill with an outer diameter of 15 mm and length of 5 mm is clamped in the device from Example 2 with a clamping force of 20N to 60N and pill resistance of 2 to 100 Ohms. The voltage applied to the pill may be DC, AC, or any combination thereof. In a pre-process step a lower voltage of 80 to 100 V is applied to the pill for duration of 500 ms. The pre process step is repeated as needed based on the nature of the initial feedstock. The resistance of the carbon pill, the voltage induces a current that then heats the sample rapidly to temperatures from 400° C. to 800° C. At temperatures between 400° C. to 800° C., most volatiles and the moisture in the carbon pill are removed. If the carbon pill is too dense, the outgassing pressure may fracture the carbon pill. In the preferred carbon pill, voids are present in the carbon pill that allow the outgass to escape without fracturing the pill.

In a final process step, voltage of 160V to 400V is applied to the pre-processed carbon pill for a duration of 50 ms to 1 sec. During the joule heating of the pill, the resistance dramatically lowers and therefore the current through the pill dramatically increases to between 1500 to 3000 Amperes and the pill temperature reaches 2800° C. to 3000° C., during which the carbon is converted to graphene. The final process step may be repeated several times depending on the composition and size of the carbon pill. Most of the energy of the carbon pill is removed via radiation cooling, which may also be referred to as a light flash, and the carbon pill cools quickly back to room temperature but the carbon material is converted into graphene. In some cases, the graphene stays as a deformed pill and in some cases the pill disintegrates and becomes powder. In some embodiments, the graphene has a light gray color, an indication of presence of graphene.

In some embodiments, the pre-process step and the final process step are integrated into a single joule heating step where the temperature profile of the joule heating is controlled by controlling the voltage to the electrodes. The carbon pill is first heated at lower temperatures followed by heating to high temperatures but all in one continuous heating step. The temperature profile may be controlled with the use of a proportional integral derivative (PID) control loop where the input is the pill temperature as measured by a pyrometer and the output is the voltage to the electrodes that for a given pill resistance provides a corresponding current. The current induces joule heating of the pill. The PID control loop may be optimized with predictive models and machine learning.

In a post process step the graphene pill or powder is sieved though a sieve to remove large grains that may be a carbon not converted into graphene. In some embodiments, the graphene powder is soft and may easily be pushed through a sieve and may easily be ground to even smaller particles. In one configuration the hard to grind grains are not graphene and may therefore easily be filtered out. The final graphene grains may be in the range from 1 to 150 microns, depending on the starting size of the carbon material grains.

Figure 10:
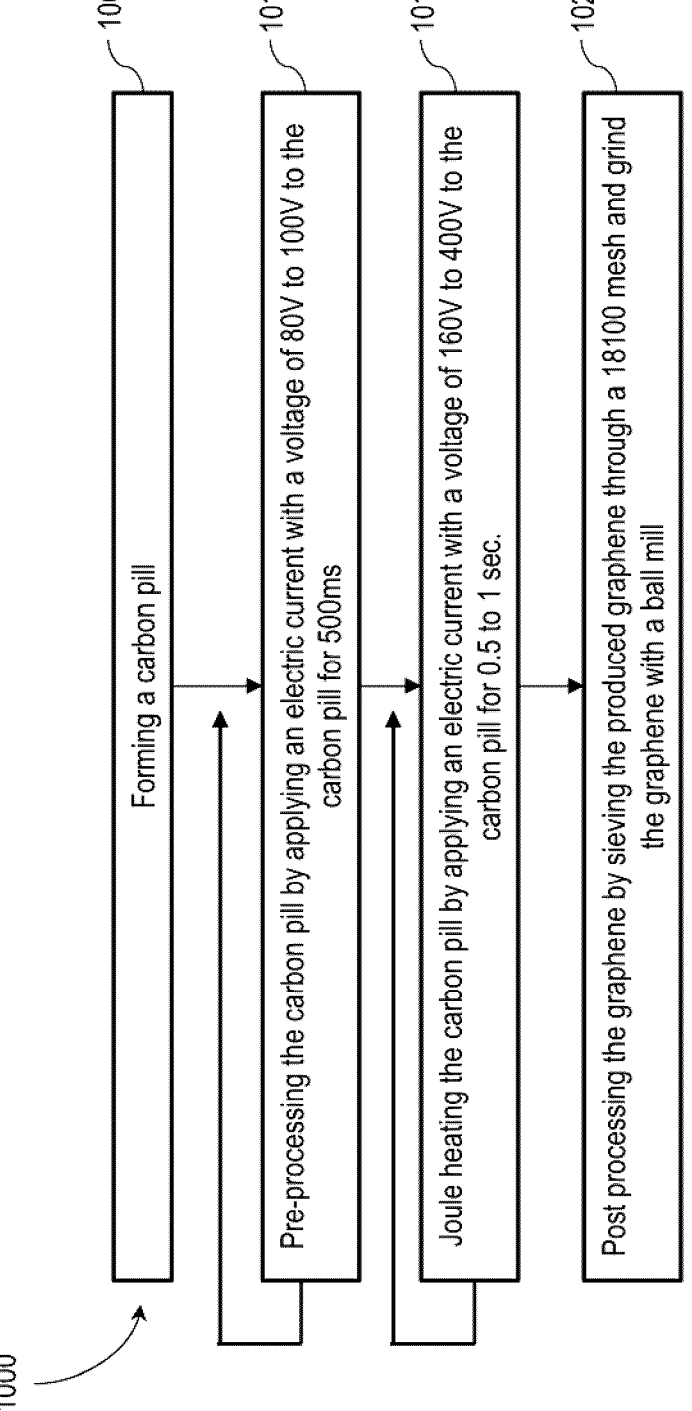
FIG. 10 illustrates a flow chart demonstrating a method of producing graphene, according to an embodiment.

Referring to FIG. 10, illustrated therein is a flow chart demonstrating a method 1000 of producing graphene, according to an embodiment. The method 1000 includes forming a carbon pill, at 1005. The pill preferably has an outer diameter of 15 mm and a thickness of 4-5 mm. The carbon pill is preferably formed using 5 metric tons of compressive force. The carbon pill preferably clamped with a force of 20N-60N in a device for converting the carbon pill to graphene. The carbon pill preferably has a resistance of 2-100 Ohms.

The method 1000 includes pre-processing the carbon pill by applying an electric current with a voltage of 80V to 100V to the carbon pill for 500 ms, at 1010. The pre-processing 1010 is repeated until all moisture and volatile substances are removed from the carbon pill.

The method 1000 also includes joule heating the carbon pill by applying an electric current with a voltage of 160V to 400V to the carbon pill for 0.5 to 1 sec, at 1015. The process is repeated until all the carbon pill is converted into graphene.

The method 1000 also includes post processing the graphene by sieving the produced graphene through a #100 mesh and grind the graphene with a ball mill, at 1020.

The production of graphene, and in particular a turbostratic graphene, from a carbon pill with the use of the device of Example 2 may be modified to produce large quantities of graphene in the rate of 1 kg per day to 1 metric ton per day.

Figure 11:
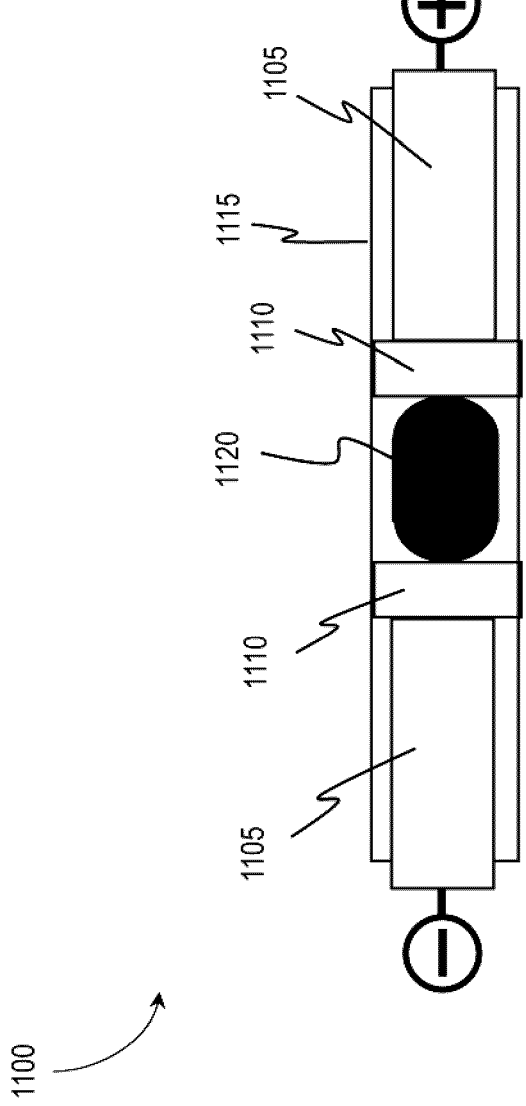
FIG. 11 illustrates is a device performing a method of converting a carbon pill to graphene, according to an embodiment.

Referring to FIG. 11, illustrated therein is a device 1100 performing a method of converting a carbon pill 1120 to graphene, according to an embodiment. The carbon pill 1120 is compressed between two graphite disks 1110 connected to brass electrodes 1105 in a 10.5 mm inner diameter quartz tube 1115. A gap is present between the carbon pill 1120 and the quartz tube 1115 wall. Also, due to the oval shape of the carbon pill 1120, the graphite disks 1110 touch the pill at a tangent. The carbon pill 1120 was pre-treated with a low voltage electric current until the resistance dropped from between 20 to 40 Ohms to about 1.5 Ohms. During the pre-treatment the pill maintains its shape. After the joule heating with a high voltage electric current, the carbon pill 1120 disintegrates into graphene powder and very small amount of powder escaped the tube. A fine dust remained along the inner tube walls of the quartz tube 1115 and that dust was cleaned with a Kimwipe and alcohol. The final bulk powder material was graphene.

Figure 12:
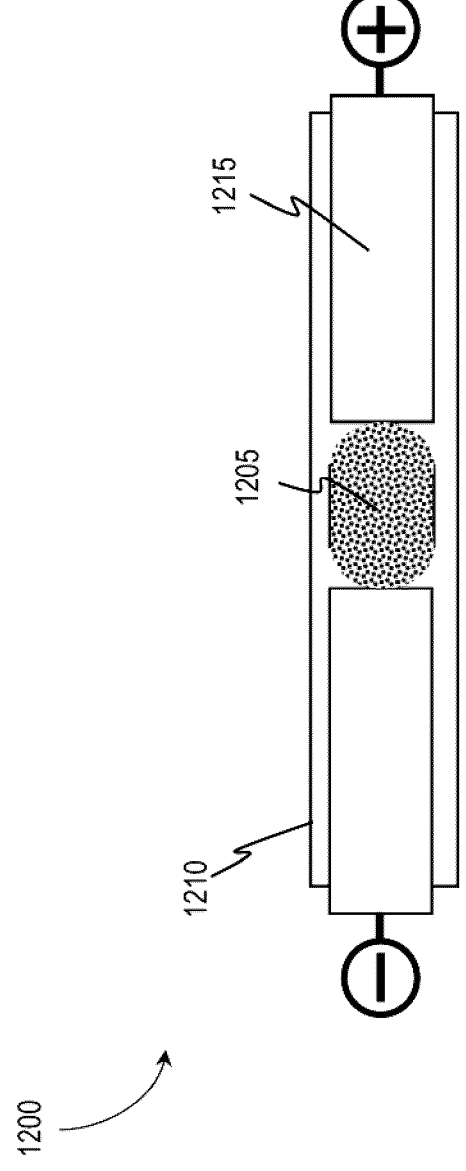
FIG. 12 illustrates a device performing a method of converting a carbon pill to graphene without graphite disks, according to an embodiment.

Referring to FIG. 12, illustrated therein is a device 1200 performing a method of converting a carbon pill 1205 to graphene without graphite disks, according to an embodiment. The process for graphene conversion is the same as for the device 1100 of FIG. 11, however, the brass electrodes 1215 make direct contact with the carbon pill 1205. A gap is also present between the carbon pill 1205 and the quartz tube 1210 wall. The joule heating current is up to 1459 Amperes. Due to they direct contact with the carbon pill 1205, the brass electrodes 1215 may melt during the joule heating process.

Figure 13:
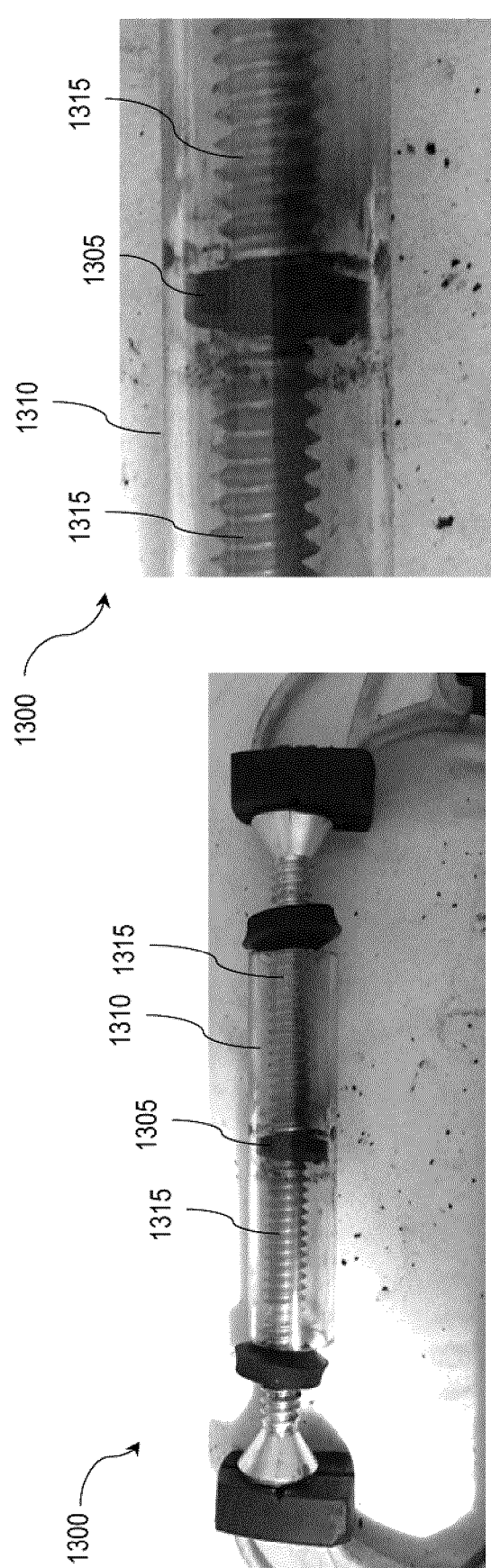
FIG. 13 illustrates a device performing a method of converting a flat carbon pill to graphene without graphite disks, according to an embodiment.

Referring to FIG. 13, illustrated therein is a device 1300 performing a method of converting a flat carbon pill 1305 to graphene without graphite disks, according to an embodiment. The device 1300 for joule heating the carbon pill 1305 is shown. A 250 mg of the first carbon material (90% coffee and 10% carbon black) is pressed into a pill form and is pre-treated until the pill resistance is reduced to below 2 Ohms. The pill 1310 maintains shape following joule heating, but loses some mass and becomes 200 mg. The pre-treated 200 mg is ground in a mortar and pressed again as a pill. The pill is placed in the 10.5 mm ID quartz tube 1310 and the pill contacts with the brass screws 1315 only. After some additional pre-treatment, the carbon pill 1315 remains intact. After the pill 1305 is joule heated the pill 1305 turns into graphene powder, having gray matter over the entire volume. Despite having lots of voids for the carbon to escape, not much graphene is lost during the flash. The typical final graphene mass is 96 mg (starting from 200 mg pill) for a coffee-based carbon pill 1305.

In one process example the sample is first pressed as a pill, then it is inserted into the device for converting a carbon pill into graphene, and then during the joule heating process carbon pill compositions are shown. Samples 64, 65C, 68C, 70C, 71C, and 72C possess a 10% carbon black and 90% coffee composition. Samples 73C and 74C possess a 70% petroleum coke and 30% pine bark composition. The samples with a "C" in the sample name are compressed in a 4 mm diameter pill that is then joule heated to convert the carbon pill into graphene in a quartz tube that has a larger 10 mm inner diameter. Therefore, the gap between the pill and the quartz is 3 mm. Sample 64 is not compressed and is used as a reference. The Raman spectroscopy results show the ratio between the 2D and G bands (2D/G). Accordingly, the 2D/G of the produced graphene varies from 0.7 to 1.2. These results confirm the feasibility of making graphene from compressed suspended carbon pills.

TABLE 3

Properties of carbon pill embodiments.

| Sample | Composition | Mass before pre-processing (mg) | Mass after pre-processing (mg) | Density (g/cc) | Resistance before pre-processing | Resistance after pre-processing | 2D/G of produced graphene |
|---|---|---|---|---|---|---|---|
| 64 | 10% Carbon Black 90% Coffee | 50 | 16.9 | N/A | 84 | 0.83 | 1 |
| 65C | 10% Carbon Black 90% Coffee | 55.6 | 14 | N/A | 64 | 1.6 | 0.7 |
| 68C | 10% Carbon Black 90% Coffee | 80 | 29.5 | N/A | 105 | 1.2 | 1.2 |
| 70C | 10% Carbon Black 90% Coffee | 95.6 | 29.3 | 1.1 | 19 | 0.33 | 1 |
| 71C | 10% Carbon Black 90% Coffee | 91 | 27 | 1.2 | 74 | 0.8 | 1 |
| 72C | 10% Carbon Black 90% Coffee | 96.5 | N/A | 1.2 | 82 | 3.18 | 0.4 |
| 73C | 70% Petroleum Coke 30% Pine Bark | 96 | 69.2 | 1.4 | 105 | 0.19 | 0.9 |
| 74C | 70% Petroleum Coke 30% Pine Bark | 104 | 76 | 1.336 | 126 | 0.47 | 0.7 | there is a step where the carbon pill is pretreated at temperatures from 200° C. to 1000° C. to remove moisture, oils, and other volatiles, before it is joule heated at temperatures from 2600° C. to 3000° C. to convert the carbon into graphene.

In some embodiments, the carbon pill keeps its shape and does not crumble during pre-treatment.

In some embodiments, the first carbon material is first pretreated separately to remove moisture, oils, and other volatiles, and then the pretreated first carbon material is ground and then pressed as a pill. In the following step the carbon pill from the pretreated first carbon material is inserted into a device for converting a carbon pill into graphene is joule heated at temperatures from 2600° C. to 3000° C. to convert the carbon into graphene.

In an embodiment, the carbon pill keeps its shape and does not crumble after the joule heating process converts the carbon into graphene and in another variation the pill turns into graphene powder.

Figure 14:
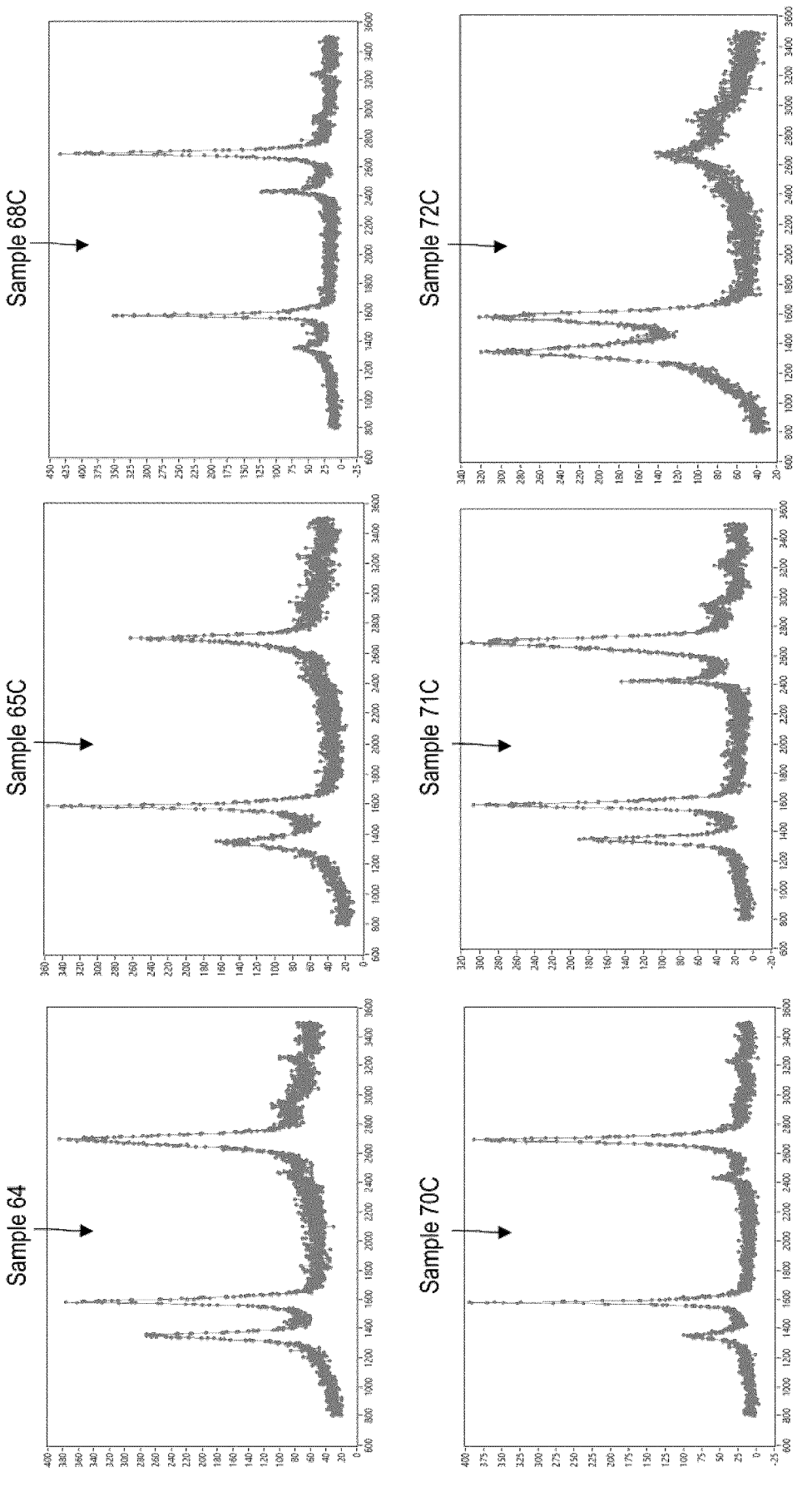
FIG. 14 illustrates, according to an embodiment, Raman spectroscopy readings of the graphene produced from the carbon pill samples from Table 3.

Referring to Table 3, properties of several embodiments of carbon pills is shown. Two different combination of Referring to FIG. 14, illustrated therein, according to an embodiment, are Raman spectroscopy readings of the graphene produced from the carbon pill samples from Table 3. The 2D/G ratio of the graphene produced by sample 64 is 1. The 2D/G ratio of the graphene produced by sample 65C is 0.7. The 2D/G ratio of the graphene produced by sample 68C is 1.2. The 2D/G ratio of the graphene produced by sample 70C is 1. The 2D/G ratio of the graphene produced by sample 71C is 1. The 2D/G ratio of the graphene produced by sample 72C is 0.4. The 2D/G ratio of the graphene produced by sample 73C is 0.9. The 2D/G ratio of the graphene produced by sample 74C is 0.7.

Figure 15:
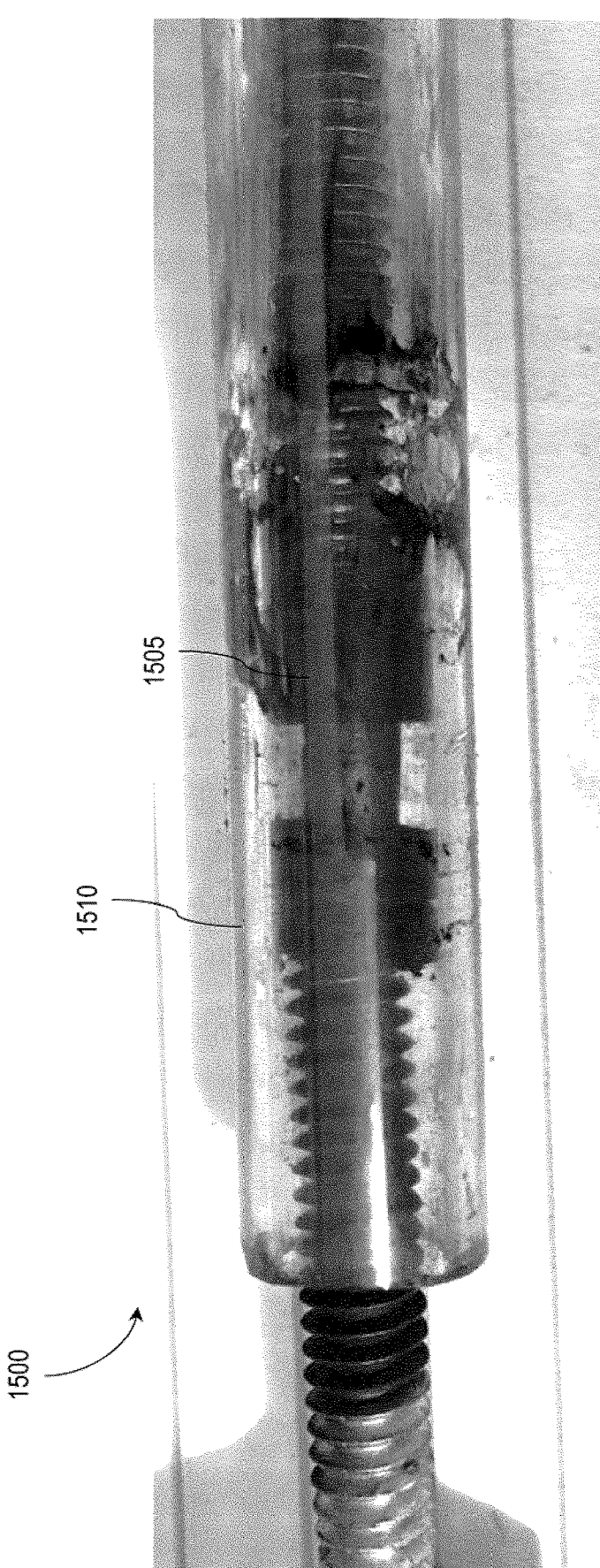
FIG. 15 illustrates a device for converting a carbon pill into graphene after joule heating, according to an embodiment.

Referring to FIG. 15, illustrated therein is a device for converting a carbon pill 1505 into graphene after joule heating, according to an embodiment. The carbon pill 1505 is made from a 70% petroleum coke and 30% Pine Bark mixture and compressed in a 4 mm diameter pill with a density of 1.4 g/cc. The carbon pill 1505 following joule heated in a larger 10 mm quartz tube 1510 is shown. Some debris during the joule heating process is collected along the tube wall, however the carbon pill 1505 does not make contact with the tube wall.

Figure 16:
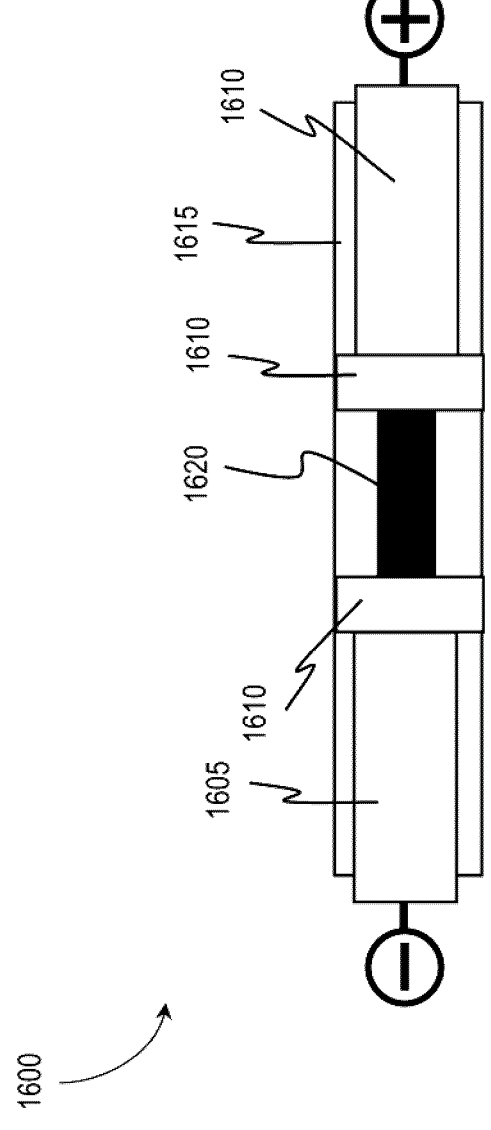
FIG. 16 illustrates a device performing a method of converting a cylindrical carbon pill to graphene, according to an embodiment.

Referring to FIG. 16, illustrated therein is a device 1600 performing a method of converting a cylindrical carbon pill 1620 to graphene, according to an embodiment. The compressed pill 1620 has a cylindrical shape to allow better electrical contact to the graphite disk 1610 connected to the electrode 1605. The cylindrical shape with a smaller diameter than the inner tube also provides a gap between the carbon pill 1620 and the tube 1615. The tube 1615 may not be transparent.

In an embodiment, following joule heating of the carbon pill, during which the carbon is converted to graphene at temperatures between 2600° C. to 3000° C., the carbon pill preferably cools very fast through radiation cooling. When the compressed carbon is in contact with the tube, the tube has to be optically transparent to allow for the light to escape fast and allow radiative cooling.

In an embodiment, the covering tube, does not have to be transparent as long as the distance from the sample to the tube is long enough and has large enough heat capacity to allow fast radiative heat transfer from the sample to the tube.

In an embodiment, the gap between the sample and the cover wall is 1 mm to 5 mm, and in another example, the gap is 5 mm to 100 mm. The material of the covering tube materials include, without limitation, ceramic, alumina, stainless steel, or aluminum. For electrically conductive cover tubes there needs to be electrical insulation from the electrodes and the sample. It may be beneficial to actively cool the covering tube to remove the accumulated heat from the covering tube. Active cooling methods may include forced air cooling and water cooling of the external walls of the covering tube.

Figure 17:
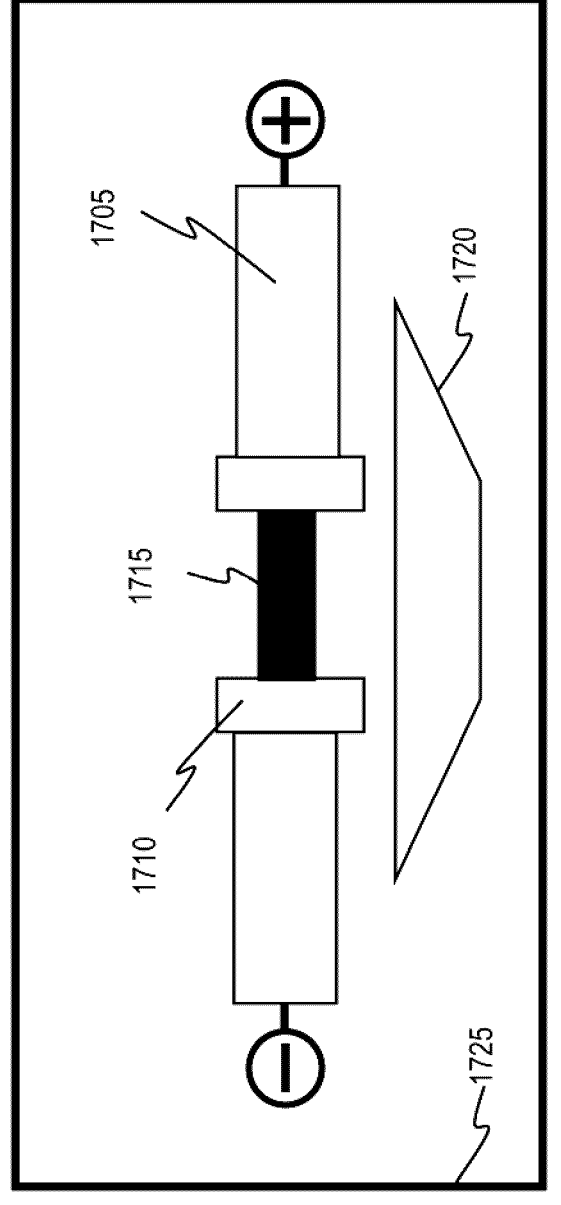
FIG. 17 illustrates a device performing a method of converting a cylindrical carbon pill to graphene without a cover tube, according to an embodiment.

Referring to FIG. 17, illustrated therein is a device 1700 performing a method of converting a cylindrical carbon pill 1715 to graphene without a cover tube, according to an embodiment. No covering tube is present proximity of the carbon pill 1715. The graphite disks 1710 connected to the electrodes 1705 come into direct contact with the carbon pill 1715. The radiative heat will dissipate into the surrounding and allow fast cooling of the graphene. A collection tray 1720 is positioned under the process area so as to collect any graphene that has turned into powder. A vacuum chamber 1725 encloses the joule heating apparatus and it may be part of the apparatus. The vacuum chamber, also referred as the enclosure, may be pumped out to a vacuum or alternatively it may be filled with a gas from the group of nitrogen, argon, helium, oxygen, and combinations thereof. The vacuum chamber may be made from the group of materials including plexiglass, polycarbonate, polyvinyl chloride, aluminum, and stainless steel.

In an embodiment, the first carbon material is milled and sieved so that the pill is made out of carbon grains of similar sizes. All the grains may be in the range of 100 to 200 microns. Alternatively, the carbon grains may be in the range from 200 to 300 microns. Alternatively, the grains are in the range from 300 to 600 microns. Milling and sieving the first carbon material makes the carbon pill more uniform in density and creates voids in the pill that enable outgassing at high temperatures that do not fracture the pill. Finer grain size powders demonstrate tendency toward higher durability and thinner pills. Larger grain size powders demonstrate a tendency towards thicker pills, discrete carbon material phases. Larger grain feedstocks are Joule heated directly without the need to pre-process the carbon material and remove the volatiles.

In an embodiment, the carbon pill is made of two or more species of carbon powder, each with similar range of grains. Each powder adds a different property. One carbon species may add binding properties and another one may add the conductive properties of the pill.

In an embodiment, the pill is made of two or more species of carbon powder, wherein one species has large (microns sized) and uniform size of grains while the other is nanometer sized. Each powder may add a different property. The larger carbon species may add binding properties and the other one may add the conductive properties of the pill. One example of this pill formulation is the mix of easy to bind Green Pet Coke with grain sizes between 200 and 300 microns and conductive Carbon Black with grain sizes in nanometers.

In an embodiment, the carbon pill is made of two or more species of carbon powder. One species has substantially round grains and the other species has elongated fibers, such as carbon nanotubes or carbon fiber.

Figure 18:
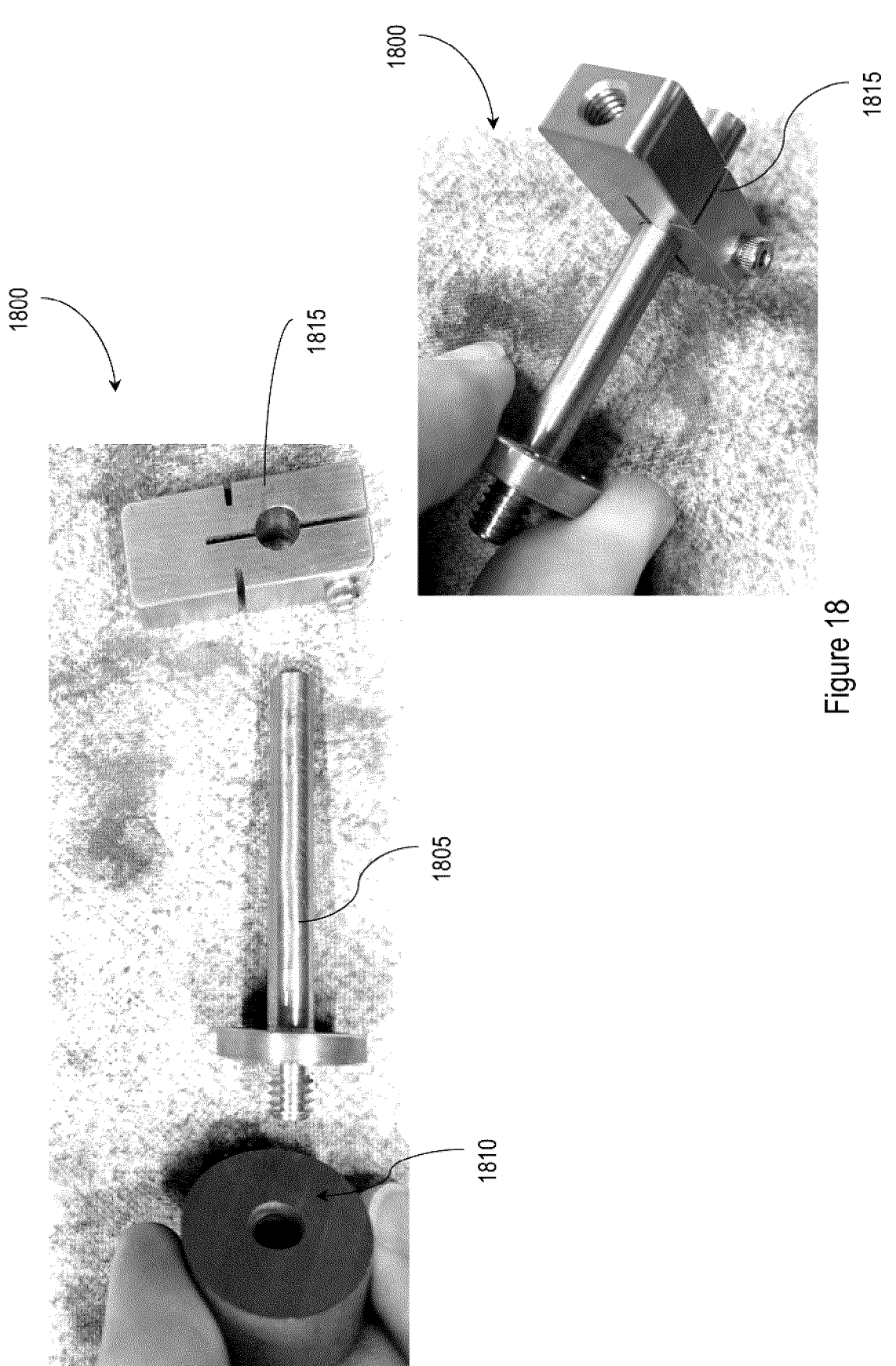
FIG. 18 shows a disassembled electrode of the device for converting a carbon pill to graphene is shown, according to an embodiment.

Referring to FIG. 18, a disassembled electrode 1800 of the device for converting a carbon pill to graphene is shown, according to an embodiment. The electrode has 2 parts, a metal component 1805, such as brass, and a graphite disk termination 1810. The metal part of the electrode can be made from a high temperature metal from the group comprising brass, copper, tungsten, titanium, stainless steel, stainless steel allows, molybdenum, tantalum, nickel, an alloy, and combinations thereof. The graphite disk 1810 may be screwed into the brass 1805 or the brass component 1805 may have a face where the graphite disk 1810 has better electrical contact to the brass component 1805. An electrically conductive surface which makes contact with a carbon pill may be either the brass component 1805 of the electrode 1800 or the graphite disk 1810. The electrodes include a clamp 1815 that is configured to pass high density current from a flat surface electrode to a cylindrical surface electrode. In some embodiments, the brass component is alternatively made of copper.

While the above description provides examples of one or more apparatus, methods, or systems, it will be appreciated that other apparatus, methods, or systems may be within the scope of the claims as interpreted by one of skill in the art.

The invention claimed is:

1. A device for converting a carbon pill into a synthesized material comprising:

a space between at least two electrically conductive surfaces, wherein the electrically conductive surfaces are configured to support and conductively couple with at least one carbon pill in the space, wherein the at least two electrically conductive surfaces are coupled to compression springs to apply a compressive force to the conductive surfaces and suspend the at least one carbon pill in the space;

at least two electrodes electrically coupled to the at least two electrically conductive surfaces, wherein at least one electrode of the at least two electrodes includes a sliding bearing;

a power supply connected to the electrodes for passing a current through the at least one carbon pill via the electrically conductive surfaces coupled to the at least two electrodes to convert the at least one carbon pill into the synthesized material; and a force sensor for detecting the compression force applied to the at least one carbon pill, wherein the force sensor includes a disk force sensor that is situated between the sliding bearing and a compression spring.

2. The device of claim 1 further comprising a resistance sensor for measuring electrical resistance of the at least one carbon pill.

3. The device of claim 1, wherein the conductive surfaces are graphite disks.

4. The device of claim 1, wherein the synthesized material is graphene.

5. A method for synthesizing a synthesized material comprising:

compressing at least one carbon pill in between two electrodes, wherein the electrodes are configured to support and conductively couple with the at least one carbon pill, wherein the pill comprises:

a first carbon material for synthesizing the synthesized material by joule heating;

a second material for at least one of:

binding the first carbon material from a powder form into a pill form; and improving conductivity of the first carbon material;

applying an electric current to the at least one carbon pill via the electrodes; and converting predominantly the first carbon material to the synthesized material, wherein applying the electric current to the at least one carbon pill includes:

applying a first electric current to the carbon pill at a lower voltage for removing moisture and volatile materials from the at least one carbon pill; and applying a second electric current to the carbon pill at a higher voltage for converting the first carbon material to the synthesized material.

6. The method of claim 5, wherein the electric current is continuously applied between the lower voltage and the higher voltage, wherein the lower voltage is between 80V-100V, and wherein the higher voltage is between 160V-400V.

7. The method of claim 6, wherein the lower voltage heats the carbon pill to a temperature of between 400° C.-800° C.

8. The method of claim 6, wherein the higher voltage heats the pill between 2800° C.-3000° C.

9. The method of claim 5, wherein the synthesized material is graphene.

10. A carbon pill for a synthesized material conversion comprising:

a first carbon material for synthesizing to the synthesized material by joule heating, wherein the first carbon material is compressed from a powder form into a pill form configured to be supported by and conductively coupled with at least two electrodes for passing a current through the carbon pill; and a second material for at least one of:

binding the first carbon material from a powder form into a pill form; and improving conductivity of the first carbon material, wherein the carbon pill has a density of about 0.7-1.4 g/cc.

11. The carbon pill of claim 10 wherein the second material is for binding the first carbon material from a powder form into a pill form.

12. The carbon pill of claim 10 wherein the second material is for improving conductivity of the first carbon material.

13. The carbon pill of claim 10 having a conductivity of about 16-140 mS/m.

14. The carbon pill of claim 10 further comprising a lubricant additive material for aiding the flow and compression of the first carbon material, wherein the lubricant additive includes at least one of the group comprising microcrystalline cellulose, dicalcium phosphate, magnesium stearate, and silicon dioxide.

15. The carbon pill of claim 10, wherein at least one end side of the carbon pill is predominately flat or belongs to the group of concave and convex surfaces.

16. The carbon pill of claim 10, wherein the synthesized material is graphene.

\* \* \* \* \*